United States Patent
Anderson et al.

[11] Patent Number: 6,119,916
[45] Date of Patent: Sep. 19, 2000

[54] INTERNAL BACKUP RING SYSTEM

[75] Inventors: Clifford J. Anderson; Brian R. Thicke; Mark R. Sawa, all of Alberta, Canada

[73] Assignee: Proline Pipe Equipment Inc., Alberta, Canada

[21] Appl. No.: 09/182,545

[22] Filed: Oct. 29, 1998

[30] Foreign Application Priority Data

Oct. 23, 1998 [CA] Canada .................................. 2251307

[51] Int. Cl.[7] ........................ B23K 37/053; B23K 37/04; B23K 5/22

[52] U.S. Cl. ........................ 228/44.5; 228/212; 219/61.1

[58] Field of Search .................................. 228/44.5, 212, 228/213, 44.3; 219/59.1, 61.1; 269/55, 57

[56] References Cited

U.S. PATENT DOCUMENTS

| | | |
|---|---|---|
| 3,741,457 | 6/1973 | Gwin et al. . |
| 3,859,938 | 1/1975 | Fukuyama .......................... 112/121.15 |
| 3,937,382 | 2/1976 | Cunningham et al. . |
| 3,979,041 | 9/1976 | Kaneyama et al. . |
| 4,165,831 | 8/1979 | Connell . |
| 4,177,914 | 12/1979 | Clavin . |
| 4,201,326 | 5/1980 | Connell . |
| 4,285,458 | 8/1981 | Slavens . |
| 4,556,162 | 12/1985 | Gwin et al. . |
| 4,648,544 | 3/1987 | Puisais et al. . |
| 4,682,724 | 7/1987 | Hahn . |
| 5,110,031 | 5/1992 | Rinaldi . |
| 5,356,067 | 10/1994 | Leduc . |
| 5,471,030 | 11/1995 | Boula . |
| 5,535,938 | 7/1996 | Leduc . |
| 5,597,108 | 1/1997 | Dierlam . |
| 5,624,067 | 4/1997 | Harwig et al. . |
| 5,664,837 | 9/1997 | Takagi ..................................... 297/367 |

FOREIGN PATENT DOCUMENTS

| | | |
|---|---|---|
| 2183156 | 8/1995 | Canada . |
| 0 624 425 | 11/1994 | European Pat. Off. . |
| 2067945 | 8/1981 | United Kingdom . |

OTHER PUBLICATIONS

PCT International Search Report, Feb. 14, 2000.

*Primary Examiner*—Patrick Ryan
*Assistant Examiner*—Jonathan Johnson
*Attorney, Agent, or Firm*—Rodman & Rodman

[57] ABSTRACT

An actuation system preferably for mounting between front and rear clamping mechanisms in a pipe clamping apparatus as part of an internal backup ring system. The system includes a guide, a cam plate positioned adjacent to the guide and rotatable relative thereto, a drive mechanism coupling the guide and the cam plate such that actuation of the drive mechanism causes the cam plate to rotate relative to the guide about an axis of rotation, and a power source for driving the drive mechanism. A backup ring assembly, having a plurality of backup shoe units, may be associated with the cam plate such that rotation of the cam plate relative to the guide plate causes the backup ring assembly to move radially relative to the axis of rotation of the cam plate in order to engage or disengage the inner wall of a pipe. The system may also include auxiliary means for dislodging the backup ring assembly when at least one of the backup shoe units is stuck to the inner wall of the pipe.

31 Claims, 6 Drawing Sheets

INTERNAL BACKUP RING SYSTEM

FIELD OF INVENTION

The present invention relates to an actuation system for use in a pipe clamping apparatus and to an internal backup ring system which utilizes the actuation system.

BACKGROUND OF INVENTION

Typically, a pipeline is constructed of a number of pipe lengths or sections which are placed end to end and welded together at the respective adjacent ends as the construction of the pipeline proceeds. In order to achieve a desirable weld between the adjacent ends, the ends of the pipe sections must be clamped or held in close proximity. For this purpose, various pipe clamping apparatus have been developed for clamping the pipe sections for welding.

Once the clamping apparatus is in place, the welding is typically performed by a welding device outside of or exterior to the pipe sections. During the welding operation, a weld backup ring is preferably provided on the inside or interior surfaces of the pipe sections at the location of the abutment of the adjacent ends of the pipe sections. The backup ring is desirable for supporting the weld pool which would otherwise fall into the pipe sections during the welding operation. Also, the backup ring facilitates the formation of a relatively smooth circumferential weld internally of the pipeline.

Several conventional clamping apparatus and associated backup rings are described in United Kingdom Patent Application 2,067,945 published Aug. 5, 1981 by Rinaldi, Canadian Patent Application 2,183,156 published Aug. 17, 1995 by Brookhouse, U.S. Pat. No. 5,535,938 issued Jul. 16, 1996 to Leduc, U.S. Pat. No. 3,979,041 issued Sep. 7, 1976 to Kaneyama, U.S. Pat. No. 4,177,914 issued Dec. 11, 1979 to Clavin, U.S. Pat. No. 4,201,326 issued May 6, 1980 to Connell and U.S. Pat. No. 4,285,458 issued Aug. 25, 1981 to Slavens.

Such conventional clamping apparatus are typically capable of self-propulsion through the pipeline and include independently operable front and rear clamping mechanisms for clamping the adjacent pipe sections for welding and a backup ring for providing backup support at the weld. More particularly, the front pipe clamping mechanism comprises a plurality of clamping shoes radially movable between a retracted position and an extended position for engaging the interior surface of the front pipe section. The rear pipe clamping mechanism is also comprised of a plurality of clamping shoes radially movable between a retracted position and an extended position for engaging the interior surface of the rear pipe section.

The backup ring is similarly comprised of a plurality of segments movable between a retracted position and an extended position for engaging the interior surface of the front and rear pipes at their adjacent ends. Typically, the backup ring, is mounted with the front and rear pipe clamping mechanisms. For instance, the backup ring may either form part of, or be extendible and retractable simultaneously with, one or both of the front and rear clamping mechanisms of the associated pipe clamping apparatus.

U.S. Pat. No. 3,741,451 issued Jun. 26, 1973 to Gwin describes a relatively complex clamping apparatus which includes a backup ring which is retractable and extendible independently of the clamping mechanisms. The pipe clamping apparatus includes a clamping mechanism and a weld joint backup shoe assembly. The backup shoe assembly includes an inner torque tube rotatably mounted on a central support member. The clamping mechanism includes a pair of outer torque tubes rotatably mounted on the inner torque tube. An annular radially extending cam is mounted on each of the outer torque tubes for engagement with clamping members which are extended and retracted by movement of the associated cam. Each clamping member includes a cam follower and means for maintaining the cam follower in engagement with the associated cam. The outer torque tubes are rotated by a set of pneumatic rams in order to move the clamping members between the retracted and extended positions.

A third annular radially extending cam is mounted on the inner torque tube for engagement with backup shoes which may be extended and retracted by movement of the third cam. The backup shoes similarly include a number of cam followers and means for maintaining the cam followers in engagement with the third cam. The inner torque tube is rotated, separately or independently of the rotation of the outer torque tubes, by a separate set of pneumatic rams in order to move the backup shoe assembly between the retracted and extended positions. Thus, as stated, the structure of Gwin is relatively complex.

U.S. Pat. No. 3,937,382 issued Feb. 10, 1976 to Cunningham also permits independent operation of the weld backup. The clamping apparatus includes a first and a second set of clamping members and a weld backup mounted about a central shaft. Each of the clamping members is extended and retracted by the reciprocation of a piston coupled to the clamping members by a linkage. The weld backup includes a ring housing which defines a plurality of circumferentially spaced cylinders, each having a piston mounted therein. Each of the pistons has an end associated with a copper backup shoe. Two-way movement of each of the pistons is affected by a flow of fluid into the cylinder accommodating the piston, which results in the extension and retraction of the associated backup shoes. The operation of the pistons associated with the backup shoes is independent of the operation of the piston associated with the clamping members.

U.S. Pat. No. 5,110,031 issued May 5, 1992 to Rinaldi describes a weld supporting ring including a first crown of ring pieces (i.e., the backup shoe) and a second crown of support elements situated on either side of the first crown (i.e., the clamping mechanisms). Each ring piece of the first crown is supported by a radially extensible ring support formed by a pneumatic or hydraulic cylinder having a piston rod. Further, one end of a spring is wound about the piston rod of each ring support while the other end of the spring grips a pin mounted on an adjoining ring piece. The second crown is similarly supported by radially extensible supports consisting of pneumatic or hydraulic cylinders. The operation of the cylinders associated with the first crown appears to be independent of the operation of the cylinders associated with the second crown.

There remains a need for an actuation system which can be utilized in a pipe clamping apparatus to actuate any of a front clamping mechanism, a rear clamping mechanism or an internal backup ring system.

There also remains a need in the industry for an improved internal backup ring system for mounting between a front and rear clamping mechanism in a pipe clamping apparatus. There is a need for such a backup ring system having a relatively simple structure, which permits the operation of the backup ring system independently of the clamping mechanisms, which is relatively easily retrofittable to an existing pipe clamping apparatus, and which utilizes the front and rear clamping mechanisms to protect the internal backup ring by retracting farther than the front and rear clamping mechanisms when not in use. Finally, there is a need for a backup ring system which provides an auxiliary mechanism for the backup ring to become unstuck from the weld joint in the event such sticking occurs during the welding operation.

SUMMARY OF INVENTION

The present invention relates to an actuation system for use in a pipe clamping apparatus. Preferably the actuation system is utilized in an internal backup ring system. The actuation system may however also be adapted for use to actuate either or both of the front clamping mechanism or the rear clamping mechanism. The invention also relates to an internal backup ring system utilizing the improved actuation system.

Preferably, the backup ring system has a relatively simple structure and permits the operation of the backup ring system independently of the clamping mechanisms. Further, the internal backup ring system is preferably relatively easily retrofittable to an existing pipe clamping apparatus. Finally, the backup ring system may provide an auxiliary mechanism for the backup ring to become unstuck from the weld joint in the event such sticking occurs during the welding operation.

More particularly, the present invention relates to an actuation system for use in a pipe clamping apparatus, the system comprising:

(a) a guide;
(b) a cam plate positioned adjacent to the guide and rotatable relative to the guide;
(c) a drive mechanism coupling the guide and the cam plate such that actuation of the drive mechanism causes the cam plate to rotate relative to the guide about an axis of rotation; and
(d) a power source for driving the drive mechanism.

The invention may also comprise a clamping assembly associated with the cam plate such that rotation of the cam plate relative to the guide causes the clamping assembly to move radially relative to the axis of rotation of the cam plate. The clamping assembly may comprise a front clamping mechanism, a rear clamping mechanism, a backup ring assembly or any other similar assembly in which radial movement of clamping units is necessary.

Preferably the actuation system is adapted to be mounted between a front clamping mechanism and a rear clamping mechanism in the pipe clamping apparatus as part of an internal backup ring system, in which case the clamping assembly is preferably comprised of a backup ring assembly associated with the cam plate such that rotation of the cam plate relative to the guide causes the backup ring assembly to move radially relative to the axis of rotation of the cam plate. Any backup ring assembly capable of accommodating the radial movements described herein may be used in the invention. In the preferred embodiment, the backup ring assembly comprises a plurality of backup shoe units.

The backup shoe units are preferably capable of a limited range of radial movement between an inner limit and an outer limit without rotation of the cam plate relative to the guide. Further, each of the backup shoe units preferably comprises an urging mechanism for urging the backup shoe units toward the outer limit of the limited range of radial movement. Any biasing device or mechanism capable of urging the backup shoe units in the desired manner, such as a spring, may be used.

The features of the backup ring assembly comprising a plurality of backup shoe units and the backup shoe units being capable of a limited range of radial movement without rotation of the cam plate enable the backup ring system to adapt to pipes which are not perfectly round or which exhibit other imperfections.

Preferably, the outer limit of the limited range of radial movement is substantially similar for each backup shoe unit. However, the outer limit of the limited range of radial movement of the backup shoe units may vary so that rotation of the cam plate relative to the guide plate in the second direction causes the backup shoe units to move radially inward sequentially toward the retracted position as the backup shoe units sequentially reach the outer limit of the limited range of radial movement.

The outer limit of the limited range of radial movement may be varied in any manner compatible with the operation of the backup shoe units. However, preferably, the outer limit of the limited range of radial movement of the backup shoe units is varied, where it is desired to do so, by inserting one or more shims in the backup shoe units to increase the outer limit. The backup ring system may also be adapted for use with different sizes of pipes by using shims to selectively increase or decrease the outer limit of the limited range of radial movement.

The cam plate may be comprised of any plate or similar structure which is rotatable relative to the guide and which can provide a camming function in response to its rotation. The cam plate preferably comprises a plurality of camming surfaces which in the preferred embodiment are comprised of slots in the cam plate. The plurality of backup shoe units engage the camming surfaces so that rotation of the cam plate causes the backup shoe units to move radially relative to the axis of rotation of the cam plate by moving along the camming surfaces. Further, preferably, rotation of the cam plate relative to the guide in a first direction causes the backup shoe units to move radially outward toward an extended position for engaging an inner wall of a pipe and rotation of the cam plate relative to the guide in a second direction causes the backup shoe units to move radially inward toward a retracted position.

The guide may be comprised of any structure which can be coupled to the cam plate with a drive mechanism and which permits rotation of the cam plate relative thereto. The guide is preferably compatible with the pipe clamping apparatus such that the guide is either part of the pipe clamping apparatus or is connectable to the pipe clamping apparatus. Preferably, the guide is adapted to be fixedly connected to the pipe clamping apparatus so that the guide does not rotate relative to the pipe clamping apparatus.

In the preferred embodiment, the guide comprises a guide plate which is disposed in a plane which is substantially perpendicular to the axis of rotation of the cam plate, and the guide plate preferably comprises a guide flange extending about the perimeter of the guide plate in a plane substantially perpendicular to the plane of the guide plate in a direction toward the cam plate so that the guide plate defines a cam plate housing. The cam plate is preferably contained within the cam plate housing. The backup shoe units are preferably received in and extend through the guide flange.

The backup shoe units may be received in the guide flange in any manner compatible with the operation of the backup ring system. However, preferably the guide flange defines a plurality of sleeves for receiving the plurality of backup shoe units. Any structure for the guide plate which is capable of providing the cam plate housing may be used in the invention. In the preferred embodiment, the guide flange comprises a guide ring mounted on the guide plate.

Preferably, the backup ring system further comprises a centering shaft fixedly mounted with the guide plate such that the centering shaft extends therethrough, the cam plate is preferably rotatably mounted on the centering shaft, and the cam plate and the guide plate are preferably connected by the centering shaft such that the cam plate is rotatable relative to the guide plate and the centering shaft.

The drive mechanism may be comprised of any mechanism or device capable of coupling the guide plate and the cam plate and causing the cam plate to rotate relative to the guide plate about the axis of rotation. Preferably, the drive mechanism comprises at least one ram which is mounted on the guide plate and is operatively connected to the cam plate such that extension and contraction of the ram cause rotation of the cam plate relative to the guide plate. In the preferred embodiment, the drive mechanism comprises two rams.

The ram may be placed or contained in any location permitting the ram to perform its function as described herein. However, preferably, the guide plate and the cam plate define a ram space therebetween and wherein the ram is contained at least partly in the ram space. In the preferred embodiment, the cam plate defines a ram aperture for receiving the ram so that the ram is contained partly in the ram space and extends through the ram aperture.

The power source may be comprised of any mechanism or device capable of powering the particular drive mechanism. Preferably, the power source is pneumatic. Thus, in the preferred embodiment, the ram is pneumatically powered. Further, the ram is preferably double acting. Thus, the power source is preferably operative to cause the cam plate to rotate relative to the guide plate in the first direction and is operative to cause the cam plate to rotate relative to the guide plate in the second direction.

The backup ring system preferably comprises a primary retraction mechanism for providing a retraction force to the backup shoe units in order to dislodge them from the inner wall of a pipe. This primary retraction mechanism is preferably associated with the drive mechanism. Preferably the primary retraction mechanism is comprised of double acting rams which are part of the drive mechanism. The primary retraction mechanism may, however, be comprised of other mechanisms which can provide a retraction force to the backup shoe units, including other pneumatic mechanisms, mechanical mechanisms such as springs, hydraulic mechanisms or even electric mechanisms.

The backup ring system may also be comprised of auxiliary means for dislodging the backup ring assembly when at least one of the backup shoe units is stuck to the inner wall of the pipe in the extended position and cannot be dislodged by the primary retraction mechanism. This auxiliary dislodging means may be associated either with one or more of the backup shoe units or with the cam plate, and may include one or more of the following auxiliary dislodging means or some other means which performs a dislodging function.

Where the front clamping mechanism is capable of radial movement inward and outward relative to the axis of rotation of the cam plate, the auxiliary dislodging means may be comprised of an engagement surface on at least one of the backup shoe units for engaging the front clamping mechanism in response to inward radial movement of the front clamping mechanism when the backup shoe unit is not in the retracted position in order to urge the backup shoe unit radially inward.

Where the rear clamping mechanism is capable of radial movement inward and outward relative to the axis of rotation of the cam plate, the auxiliary dislodging means may be comprised of an engagement surface on at least one of the backup shoe units for engaging the rear clamping mechanism in response to inward radial movement of the rear clamping mechanism when the backup shoe unit is not in the retracted position in order to urge the backup shoe unit radially inward.

The auxiliary dislodging means may also be comprised of a variance of the outer limit of the limited range of radial movement of the backup shoe units. As stated above, the outer limit of the limited range of radial movement of the backup shoe units may vary so that rotation of the cam plate relative to the guide plate in the second direction causes the backup shoe units to move radially inward sequentially toward the retracted position as the backup shoe units sequentially reach the outer limit of the limited range of radial movement. This sequential radially inward movement may act to dislodge the backup ring assembly.

Where the cam plate defines a central axis, the axis of rotation of the cam plate may be offset from the central axis so that rotation of the cam plate relative to the guide plate in the second direction causes the backup shoe units to move radially inward sequentially toward the retracted position as the backup shoe units sequentially reach the outer limit of the limited range of radial movement, thus providing a further alternate form of auxiliary dislodging means.

The auxiliary dislodging means may also be comprised of a variance in the configuration of the camming surfaces on the cam plate so that rotation of the cam plate relative to the guide in the second direction causes the backup shoe units to move radially inward sequentially toward the retracted position as the backup shoe units sequentially reach the outer limit of the limited range of radial movement. The configuration of the camming surfaces is preferably varied by varying one or more of their shape or slope or their distance from the axis of rotation of the cam plate.

The drive mechanism may be actuated in any manner which causes the cam plate to rotate relative to the guide plate about the axis of rotation. For instance, the drive mechanism may be actuated concurrently with one or both of the front and rear clamping mechanisms. However, preferably, the drive mechanism is actuated independently of both the front clamping mechanism and the rear clamping mechanism.

The actuation system of the within invention may be used with many different pipe clamping apparatus, and may be used to actuate any clamping mechanism or backup ring system which requires radial movement. The internal backup ring system of the within invention may be used with many different pipe clamping apparatus, including most pipe clamping apparatus which include a front clamping mechanism and a rear clamping mechanism which can be separated to facilitate mounting of the backup ring system between them.

Preferably, the front clamping mechanism is of a type capable of radial movement relative to the axis of rotation of the cam plate between an extended position and a retracted position. Similarly, the rear clamping mechanism is preferably of a type capable of radial movement relative to the axis of rotation of the cam plate between an extended position and a retracted position.

In the retracted positions, the front clamping mechanism, the rear clamping mechanism and the backup ring assembly may each extend any distance from the axis of rotation of the cam plate. However, in the preferred embodiment, in the retracted positions at least the front clamping mechanism and most preferably the rear clamping mechanism as well extend further from the axis of rotation of the cam plate than does the backup ring assembly in order to protect the backup ring assembly from damage.

Conversely, the backup ring assembly is capable of extending at least as far and preferably further from the axis of rotation of the cam plate than are the front clamping mechanism or the rear clamping mechanism when each of the front clamping mechanism, the rear clamping mechanism and the backup ring assembly are in the extended position, thus enabling the backup ring assembly to engage the inner wall of a pipe under such conditions.

As a result, the radial distance of travel of the backup ring assembly between the extended and retracted positions is preferably greater than the radial distance of travel of the front and rear clamping mechanisms between these positions. Since the radial distance of travel of the backup ring assembly is a function of the amount of rotation of the cam plate between the extended and retracted positions and the slope of the camming surfaces, the radial distance of travel of the backup ring assembly may be varied by varying these parameters in order to achieve the desired radial distance of travel.

Finally, each camming surface preferably comprises a camming slot. Each camming slot preferably has an outermost end, and the outermost end of each camming slot preferably extends to the perimeter of the cam plate so that the backup shoe units can be removed from the backup ring assembly when the backup shoe units are in the extended position and the pipe clamping apparatus is not positioned inside a pipe. A releasable retainer may also be associated with each backup shoe unit to releasably retain the backup shoe units relative to the camming slot when the backup shoe units are in the extended position and the pipe clamping apparatus is not positioned inside the pipe.

BRIEF DESCRIPTION OF DRAWINGS

Embodiments of the invention will now be described with reference to the accompanying drawings, in which.

DETAILED DESCRIPTION

Figure 1:
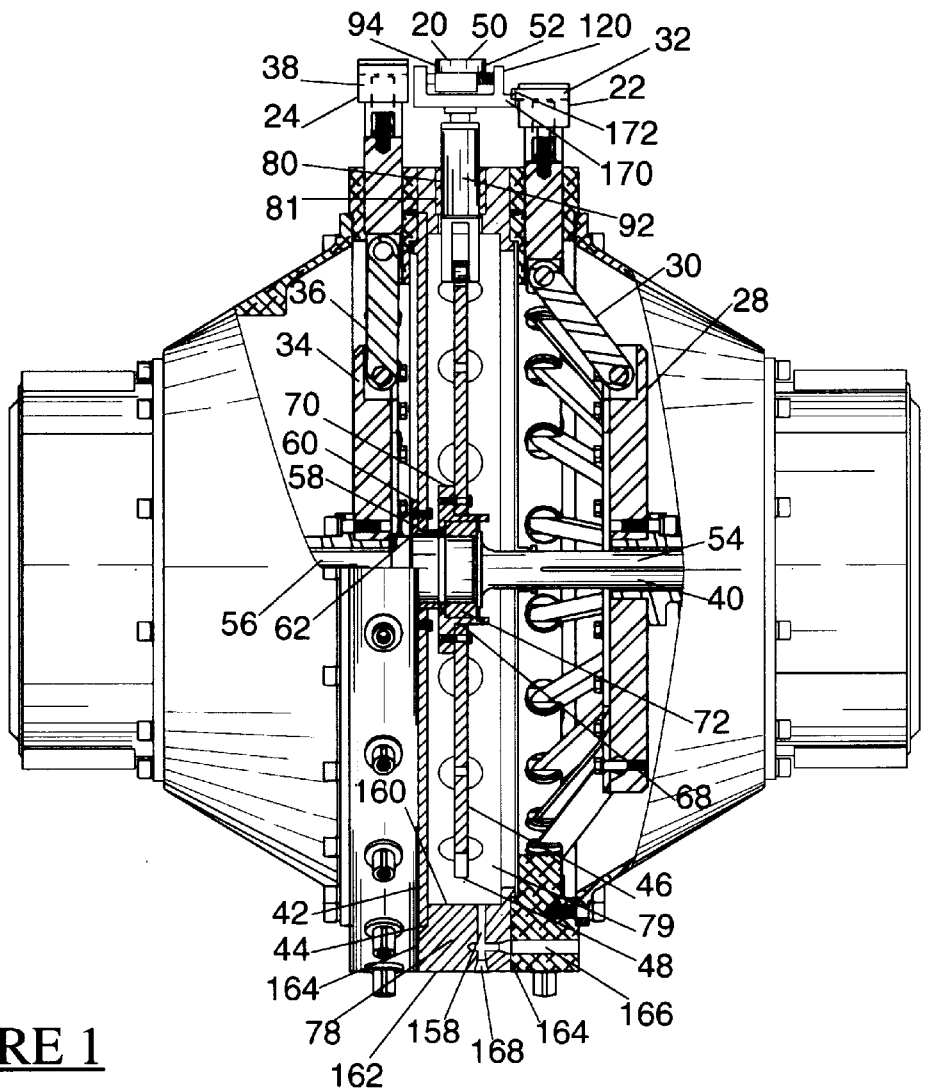
FIG. 1 is a side view, partly in section, of a preferred embodiment of an internal backup ring system of the within invention, mounted between a front clamping mechanism and a rear clamping mechanism, showing a side view of a backup shoe unit comprising the backup ring system.

The within invention is broadly directed at an actuating system for a pipe clamping apparatus. In the preferred embodiment, the invention is directed more specifically at an internal backup ring system (20) for mounting in a pipe clamping apparatus having a front pipe clamping mechanism (22) and a rear pipe clamping mechanism (24), which internal backup ring system (20) utilizes the actuation system.

The invention may be used with many different pipe clamping apparatus having a front clamping mechanism (22) and a rear clamping mechanism (24), as long as the clamping mechanisms (22, 24) can be separated to facilitate mounting of the backup ring system (20) therebetween. The backup ring system (20) may be manufactured as an element or portion of the pipe clamping apparatus. However, preferably, the backup ring system (20) comprises a separate, independent unit which is mountable in the pipe clamping apparatus. Specifically, the backup ring system (20) is preferably configured to be retrofittable with such pipe clamping apparatus.

In this specification, a "pipe" includes any length of hollow conduit which will permit the passing of a pipe clamping apparatus therethrough and which typically is connected with other lengths of conduit. In the preferred embodiment, the backup ring system (20) is intended for use in conjunction with lengths of metal conduit which are connected together by welding.

Specifically, the backup ring system (20) is configured to be mounted in a pipe clamping apparatus between the front clamping mechanism (22) and the rear clamping mechanism (24). Once mounted, the pipe clamping apparatus may be used either with or without the engagement of the backup ring system (20). This is permissible as the backup ring system (20) is preferably configured such that it may be actuated, where desired, independently of the actuation of either or both of the front and rear clamping mechanisms (22, 24).

Pipe clamping apparatus are typically designed to exert a radial pressure against an inner wall of two adjacent joints or sections of pipe to be welded together. Specifically, the pipe clamping apparatus aligns and holds the adjacent ends of the pipe sections in a desired orientation during the welding operation or the welding of the root or stringer bead.

Typically, such pipe clamping apparatus have a front end and a rear end and include a nose guide located adjacent the front end of the apparatus, a rear frame located adjacent the rear end of the apparatus and a centrebox located therebetween. Further, the apparatus includes an air tank or other mechanism for driving the apparatus including the front and rear clamping mechanisms. Finally, the apparatus preferably includes a dog latch or other mechanism for properly positioning the apparatus, and in particular the front and rear clamping mechanisms (22, 24), at the point of the weld.

The nose guide may include various controls, such as drive and brake controls for the apparatus and expand and retract controls for the front and rear clamping mechanisms. The rear frame may house or include one or more of front carrier wheel assemblies, rear carrier wheel assemblies, a brake assembly and a clamp drive assembly.

The front carrier wheel assemblies are typically mounted at a lower or bottom surface of the rear frame adjacent the forwardmost end of the rear frame, being the end nearest or closest to the front end of the apparatus. Further, the front carrier wheel assemblies are typically symmetrically spaced and are axially adjustable for contact with the inner wall of the pipe. The rear carrier wheel assemblies are typically mounted at the lower or bottom surface of the rear frame adjacent the rearwardmost end of the rear frame, being the end nearest or closest to the rear end of the apparatus. Similarly, the rear carrier wheel assemblies are typically axially adjustable for contact with the inner wall of the pipe.

The brake assembly is typically mounted at an upper or top surface of the rear frame. The brake assembly includes one or more axially extendible brake pads and one or more pneumatic brake cylinders for extending the brake pads axially outward for contact with the inner wall of the pipe in order to inhibit or impede further travel of the pipe clamping apparatus in the pipe. Preferably, the brake pads are urged toward a retracted or non-extended position when not in use by a spring-loaded or like mechanism. In addition, the brake assembly tends to facilitate or enhance the contact between the inner wall of the pipe and the rear carrier wheel assemblies during the alignment of the apparatus in the pipe by urging the rear carrier wheel assemblies into full contact with the adjacent pipe surface upon extension of the brake pads.

The clamp drive assembly typically includes two or more sets of pivoting drive wheels powered by one or more reversible air motors. At least one set of drive wheels is located on opposing side surfaces of the rear frame. One or more double acting pneumatic cylinders, or other drive mechanism, urges the drive wheels outward from each side surface of the rear frame for contact with the inner wall of the pipe. Activation of the air motors powers the drive wheels and thereby propels the pipe clamping apparatus, causing it to travel either forward or rearward within the pipe.

The centrebox of the pipe clamping apparatus typically includes the front clamping mechanism (22) and the rear clamping mechanism (24). Further, the front and rear clamping mechanisms (22, 24) are typically aligned by a centering shaft. The centering shaft acts as a centering and alignment guide for the front and rear clamping mechanisms (22, 24) during the welding operation. The centering shaft extends longitudinally through at least a portion of the pipe clamping apparatus between its front and rear ends. As well, at least one double acting air cylinder, or other drive mechanism, is associated with each of the front and rear clamping mechanisms (22, 24). These air cylinders preferably operate independently of each other such that the front and rear clamping mechanisms may be actuated independently of each other. More particularly, preferably, a front air cylinder actuates the front clamping mechanism (22) and an independent rear air cylinder actuates the rear clamping mechanism (24).

The front clamping mechanism (22) is capable of radial movement relative to a longitudinal axis defined by the centering shaft of the apparatus such that the front clamping mechanism (22) may be moved between an extended position, in contact with the inner wall of the pipe, and a retracted position, out of contact with the inner wall. Actuation of the double acting front air cylinder causes the front clamping mechanism (22) to move between its extended and retracted positions as desired. Similarly, the rear clamping mechanism (24) is capable of radial movement relative to the longitudinal axis of the pipe clamping apparatus such that the rear clamping mechanism (24) may also be moved between an extended position, in contact with the inner wall of the pipe, and a retracted position, out of contact with the inner wall. Actuation of the double acting rear air cylinder causes the rear clamping mechanism (24) to move between its extended and retracted positions as desired.

The front and rear clamping mechanisms (22, 24) may be comprised of any structure, mechanism, elements or devices capable of moving the clamping mechanisms (22, 24) between their retracted and extended positions in the manner described herein. Preferably, a structure, mechanism, elements or devices are provided which are compatible with the use of the front and rear air cylinders described above. As well, each of the front and rear clamping mechanisms (22, 24) is comprised of a plurality of clamping shoe units which are retractable and extendible radially thereby for engagement with the inner wall of the pipe sections to be welded. Any type of clamping shoe units may be used as long as they are compatible with the internal backup ring system.

Although either or both of the front and rear clamping mechanisms (22, 24) may utilize the same actuation system as described herein with respect to the internal backup ring system (20), a preferred conventional front clamping mechanism (22) is depicted in FIG. 1 which includes a front spider linkage assembly (28) comprised of a plurality of toggle links (30). Each toggle link (30) is connected with a front clamping shoe unit (32). Upon the extension of the front air cylinder, the front air cylinder acts on the front spider linkage assembly (28) to cause the toggle links (30) therein to move into a substantially vertical position. Movement of the toggle links (30) towards a vertical position causes the front clamping shoe units (32) to move radially outward towards the extended position such that the front clamping shoe units (32) are urged into contact with the inner wall of the pipe. Conversely, upon the retraction of the front air cylinder, the front spider linkage assembly (28) causes the toggle links (30) to move away from the vertical position. As a result, the front clamping shoe units (32) are moved radially inward towards the retracted position such that the front clamping shoe units (32) are out of contact with the inner wall of the pipe as shown in FIG. 1.

A preferred conventional rear clamping mechanism (24) similarly includes a rear spider linkage assembly (34) comprised of a plurality of toggle links (36) as shown in FIG. 1. Each toggle link (36) is connected with a rear clamping shoe unit (38). Upon the extension of the rear air cylinder, the rear air cylinder acts on the rear spider linkage assembly (34) to cause the toggle links (36) therein to move into a substantially vertical position as shown in FIG. 1. Movement of the toggle links (36) towards a vertical position causes the rear clamping shoe units (38) to move radially outward towards the extended position such that the rear clamping shoe units (38) are urged into contact with the inner wall of the pipe. Conversely, upon the retraction of the rear air cylinder, the rear spider linkage assembly (34) causes the toggle links (36) to move away from the vertical position. As a result, the rear clamping shoe units (38) are moved radially inward towards the retracted position such that the rear clamping shoe units (38) are out of contact with the inner wall of the pipe.

Further, as stated, conventional pipe clamping apparatus typically include a dog latch or other mechanism for properly positioning the apparatus, and in particular the front and rear clamping mechanisms (22, 24) at the point of the weld. The dog latch typically rides against the inner wall of the pipe and engages the open end of the pipe section in order to properly position the pipe clamping apparatus at the point of welding. Specifically, the dog latch positions the pipe clamping apparatus at the open end of a rear pipe section prior to bringing the next section of pipe, being a front pipe section, into position so that the adjacent ends of the front and rear pipe sections may be welded together.

Finally, as stated, the pipe clamping apparatus includes a mechanism for driving the apparatus such as a pneumatic or hydraulic system. For instance, with respect to the apparatus described above, the pipe clamping apparatus is comprised of an air tank for actuating the front and rear clamp air cylinders, the pneumatic brake cylinders, the pneumatic drive wheel cylinders and the drive wheel air motors. The air tank preferably provides a reservoir of compressed air so that these various systems are operational while the air tank is disconnected from the air supply hose.

Typically, once the dog latch properly positions the pipe clamping apparatus, the rear clamping mechanism (24), which is positioned in the rear pipe section, is actuated to extend the rear clamping shoe units (38) to the extended position for engagement with the inner wall of the rear pipe section. The front pipe section is then positioned about the front end of the pipe clamping apparatus, and in particular, about the front pipe clamping mechanism (22), such that the adjacent ends of the front and rear pipe sections are spaced a desired distance apart for the welding operation. The front clamping mechanism (22) is then actuated to extend the front clamping shoe units (32) to the extended position for engagement with the inner wall of the front pipe section.

Referring to FIG. 1, the internal backup ring system (20) is mounted between the front and rear clamping mechanisms (22, 24). The backup ring system (20) may be mounted in any manner permitting the operation of the backup ring system (20) as described herein, preferably independently of the actuation of the front and rear clamping mechanisms (22, 24). However, as described in detail below, the backup ring system (20) is preferably mounted using a centering shaft (40), which also assists in maintaining the front and rear clamping mechanisms (22, 24) in alignment. The centering shaft (40) extends longitudinally through at least a portion of the pipe clamping apparatus between its front and rear ends as shown in FIG. 1.

Referring to FIGS. 1–4, the backup ring system (20) is comprised of a guide which in the preferred embodiment comprises a guide plate (42) defining a guide plate plane and having a perimeter (44) about its outermost edge. Further, the backup ring system is comprised of a cam plate (46) defining a cam plate plane and having a perimeter (48). The cam plate (46) is positioned adjacent the guide plate (42) such that a space is defined between the guide plate (42) and the cam plate (46). Further, the cam plate (46) is positioned, and mounted in a manner, relative to the guide plate (42) such that the cam plate (46) is rotatable relative to the guide plate (42). The plates (42, 46) may be positioned, and mounted, in any manner permitting the relative rotation of the plates (42, 46). However, preferably, the plane of the guide plate (42) and the plane of the cam plate (46) are substantially parallel to each other.

Further, the backup ring system (20) is comprised of a drive mechanism coupling the guide plate (42) and the cam plate (46) such that actuation of the drive mechanism causes the cam plate (46) to rotate relative to the guide plate (42) about an axis of rotation of the cam plate (46). Finally, a power source for driving the drive mechanism is provided. Any power source compatible with the particular drive mechanism may be used, which may include pneumatic, hydraulic, electric or even internal combustion power sources.

As discussed further below, any drive mechanism capable of coupling the plates (42, 46) in a manner permitting the relative rotation of the plates (42, 46) as described, may be used. Further, the drive mechanism of the backup ring system (20) may be actuatable concurrently with one or both of the front and rear clamping mechanisms (22, 24). However, in the preferred embodiment, the drive mechanism of the backup ring system (20) is actuatable independently of both the front and rear clamping mechanisms (22, 24). Independent actuation is preferred so that, amongst other reasons, the adjacent pipe sections may be positioned, fitted and wedged as desired prior to engaging the backup ring assembly (50) with the inner wall of the pipe in order to minimize the potential for any damage to be caused to the backup ring assembly (50) during this operation.

Referring to FIGS. 1–4, the backup ring system (20) further preferably comprises a backup ring assembly (50). The backup ring assembly (50) is associated with the cam plate (46) in a manner such that the rotation of the cam plate (46) relative to the guide plate (42) causes the backup ring assembly (50) to move radially relative to the axis of rotation of the cam plate (46). Any type of backup ring assembly (50) may be used as long as it is capable of moving radially in response to the relative rotation of the guide and cam plates (42, 46). However, preferably, the backup ring assembly (50) is comprised of two or more backup shoe units (52). In the preferred embodiment, the backup ring assembly (50) comprises a plurality of backup shoe units (52) movable radially in response to the rotation of the cam plate (46) about its axis of rotation.

More particularly, preferably, rotation of the cam plate (46) relative to the guide plate (42) in a first direction causes the backup shoe units (52) to move radially outward, relative to the axis of rotation, toward an extended position for engaging the inner wall of the pipe, as shown in FIG. 1. Specifically, the backup shoe units (52) move outwardly for engagement with the inner wall of each of the pipe sections to be welded at their respective adjacent ends. Conversely, rotation of the cam plate (46) relative to the guide plate (42) in a second direction, opposite the first direction, causes the backup shoe units (52) to move radially inward, relative to the axis of rotation, toward a retracted position. In the retracted position, the backup shoe units (52) are moved away from the inner wall of the pipe such that the backup shoe units (52) are disengaged therefrom and thus, the position of the pipe clamping apparatus and the backup ring system (20) may be adjusted within the pipe.

As stated above, the front clamping mechanism (22) is also preferably capable of radial movement relative to the axis of rotation of the cam plate (46) between an extended position and a retracted position. Similarly, the rear clamping mechanism (24) is preferably capable of radial movement relative to the axis of rotation of the cam plate (46) between an extended position and a retracted position.

In the extended positions, each of the front clamping mechanism (22), the rear clamping mechanism (24) and the backup ring assembly (50) are engaged with the inner wall of the pipe. In the retracted positions, each of the front clamping mechanism (22), the rear clamping mechanism (24) and the backup ring assembly (50) are disengaged from the inner wall.

In the extended positions, the backup ring assembly (50) preferably extend radially at least as far from the axis of rotation of the cam plate (46) as do the clamping mechanisms (22, 24) so that the backup shoe units (50) can engage the inner wall of the pipe. In the retracted positions, the front clamping mechanism (22), the rear clamping mechanism (24) and the backup ring assembly (50) may have any relative positions to each other, and in particular, may each be any desired distance from the axis of rotation of the cam plate (46).

However, preferably, when each of the front clamping mechanism (22), the rear clamping mechanism (24) and the backup ring assembly (50) are in their retracted positions, at least the front clamping mechanism (22) extends further from the axis of rotation of the cam plate (46) than does the backup ring assembly (50), and in particular, the backup shoe units (52). In other words, the backup shoe units (52) are retracted to a position radially inward of the front clamping mechanism (22). In the preferred embodiment, in the retracted positions, both the front clamping mechanism (22) and the rear clamping mechanism (24) extend further from the axis of rotation of the cam plate (46) than does the backup ring assembly (50), and in particular, the backup shoe units (52). Thus, the backup shoe units (52) are retracted to a position radially inward of both of the front and rear clamping mechanisms (22, 24).

These relative retracted positions are preferred in order to provide protection to the backup ring assembly (50) during movement of the pipe clamping apparatus and during the placement of the pipe sections about the pipe clamping apparatus for welding. For instance, the risk of impacting the backup shoe units (52) during the placement of the front pipe section about the front clamping mechanism (22) is lessened.

The radial distance of travel of the backup ring assembly (50) between the extended and retracted positions is therefore preferably greater than the radial distance of travel of either of the clamping mechanisms (22, 24) between these positions, which is a function of the amount of rotation of the cam plate (46) between these positions and the rate at which this rotation is converted to radial movement of the backup shoe units (52) by the cam plate (46), as will be hereinafter described.

As stated, the backup ring system (20) is mounted between the front and rear clamping mechanisms (22, 24) as shown in FIG. 1. The backup ring system (20) may be associated with the pipe clamping apparatus in any manner permitting the operation of the backup ring system (20) as described herein. However, preferably, the guide plate (42) is connected or mounted with the pipe clamping apparatus. In the preferred embodiment, the guide plate (42) is adapted to be fixedly connected to the pipe clamping apparatus so that the guide plate (42) does not rotate relative to the pipe clamping apparatus, including the front and rear clamping mechanisms (22, 24). The guide plate (42) may be fixedly connected by any mechanism or structure or in any manner permitting the operation of the backup ring system (20) and compatible with the operation of the pipe clamping apparatus.

In the preferred embodiment, the backup ring system (20) is further comprised of a centering shaft (40). Referring to FIG. 1, the backup ring system (20), including the guide plate (42) and the cam plate (46), is mounted with the pipe clamping apparatus by means of the centering shaft (40). As indicated above, conventional pipe clamping apparatus typically include a centering shaft for aligning the front and rear clamping mechanisms (22, 24). Thus, when mounting the backup ring system (20) of the within invention, the existing centering shaft of the pipe clamping apparatus may be used. However, as the backup ring system (20) is preferably inserted or retrofitted as a unit into an existing pipe clamping apparatus, preferably, the existing centering shaft of the pipe clamping apparatus is removed and the backup ring system (20), including a replacement centering shaft (40), is inserted between the front and rear clamping mechanisms (22, 24). The centering shaft (40) of the backup ring system (20) extends within the front and rear clamping mechanisms (22, 24) such that the centering shaft (40) of the backup ring system (20) centers and aligns the front and rear clamping mechanisms (22, 24) in relation to the backup ring system (20).

More particularly, the centering shaft (40) has a front end (54) and a rear end (56). The front end (54) of the centering shaft (40) extends within the front clamping mechanism (22). The rear end (56) of the centering shaft (40) extends within the rear clamping mechanism (24). Further, the centering shaft (40) preferably extends through each of the guide plate (42) and the cam plate (46), which are positioned between the front and rear clamping mechanisms (22, 24).

Thus, the centering shaft (40) aligns the front and rear clamping mechanisms (22, 24) in relation to the backup ring system (20). As well, the centering shaft (40) is preferably fixedly mounted or connected with each of the front and rear clamping mechanisms (22, 24) at its front and rear ends (54, 56) respectively. In other words, the centering shaft (40) remains stationary relative to the front and rear clamping mechanisms (22, 24) and is not rotatable therein.

The guide plate (42) defines an aperture (58) for the extension of the centering shaft (40) therethrough. Preferably, the centering shaft (40) is fixedly mounted with the guide plate (42) such that the guide plate (42) is not rotatable relative to the centering shaft (40). Thus, the guide plate (42) is not rotatable relative to the pipe clamping apparatus. The guide plate (42) may be rigidly or securely fixed to the centering shaft (40) by any fastening method, mechanism or device. For instance, the guide plate (42) may be welded to the centering shaft (40) or held in a fixed position by any type of locking mechanism. However, referring to FIGS. 1 and 2, in the preferred embodiment, a guide plate shaft mount (60) is fixed or held in position about the centering shaft (40), such that the centering shaft (40) passes therethrough, by an external snap ring (62) and a key (64). The guide plate (42) is mounted about the guide plate shaft mount (60) by inserting the guide plate shaft mount (60) within the aperture (58) of the guide plate (42). The guide plate (42) is secured to the external surface of the guide plate shaft mount (60) by one or more fasteners, such as a plurality of bolts (66).

The cam plate (46) also defines an aperture (68) for the extension of the centering shaft (40) therethrough. Preferably, the cam plate (46) is rotatably mounted on the centering shaft (40) such that the centering shaft (40) is coaxial with the axis of rotation of the cam plate (46). The cam plate (46) may be rotatably mounted on the centering shaft (40) by any fastening method, mechanism or device permitting the necessary rotation. However, referring to FIGS. 1 and 2, in the preferred embodiment, a cam plate bearing mount (70), having an internal bearing (72), is rotatably held in position about the centering shaft (40), such that the centering shaft (40) passes therethrough in contact with the bearing (72), by a retaining ring (74). The cam plate (46) is mounted about the cam plate bearing mount (70) by inserting the cam plate bearing mount (70) within the aperture (68) of the cam plate (46). The cam plate (46) is secured to the external surface of the cam plate bearing mount (70) by one or more fasteners, such as a plurality of bolts (76).

As a result of the above configuration, the cam plate (46) and the guide plate (42) are coupled by the centering shaft (40). In addition, the cam plate (46) is rotatable relative to the guide plate (42) and the centering shaft (40).

Further, referring to FIGS. 1–4, in the preferred embodiment, the guide plate (42) is comprised of a guide flange (78). The guide flange (78) extends about the perimeter (44) of the guide plate (42) in a plane substantially perpendicular to the plane of the guide plate (42) in a direction towards the cam plate (46). As a result, the guide plate (42) defines a cam plate housing (79). The cam plate housing (79) is thus essentially comprised of the guide, which in the preferred embodiment is the guide plate (42). It can therefore be seen that the function of the guide is to provide a stable point relative to which the cam plate (46) may rotate, with the result that the guide may be comprised of structures other than the guide plate (42), as long as this function is achieved. For example, the guide may be comprised of a point on the pipe clamping apparatus or may be some structure other than a guide plate (42). One advantage, however, of the guide plate (42) as described herein is its dual role as the cam plate housing (79), which better facilitates use of the invention as a modular component which can be retrofit to existing pipe clamping apparatus.

Figure 2:
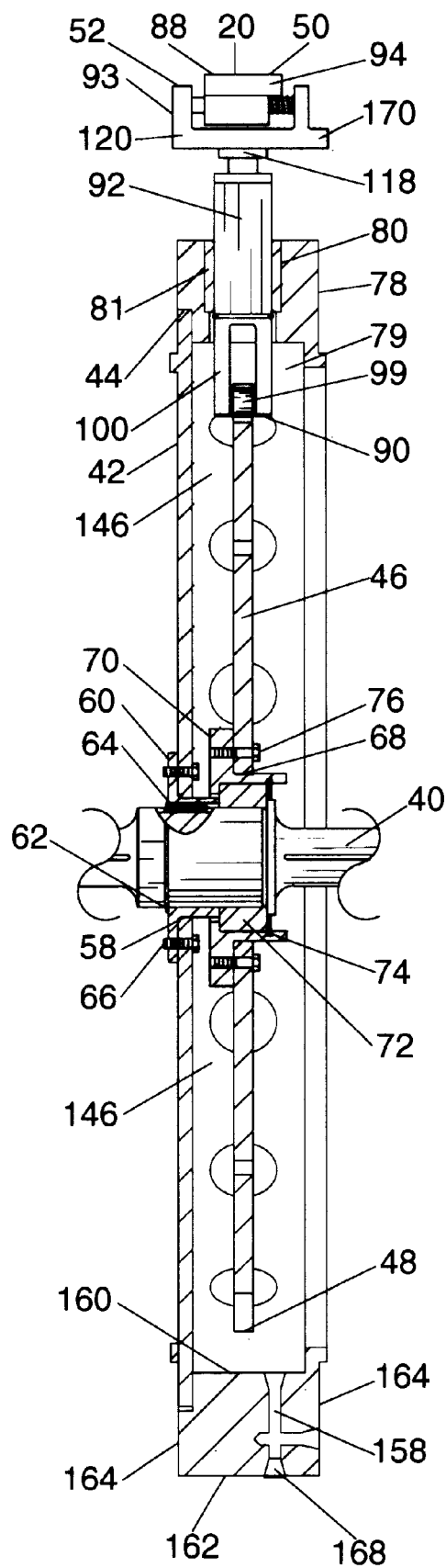
FIG. 2 is a side view, partly in section, of the internal backup ring system shown in FIG. 1, in isolation from the front and rear clamping mechanisms.

As shown in FIGS. 1 and 2, in the preferred embodiment the cam plate (46) is contained within the cam plate housing (79) defined by the guide plate (42). The guide flange (78) may be integrally formed with the perimeter (44) of the guide plate (42). However, preferably, the guide flange (78) is comprised of a separate or distinct unit which is either permanently or removably affixed to, or otherwise held in position about, the perimeter (44). In the preferred embodiment, the guide flange (78) is comprised of a guide ring mounted with the guide plate (42).

The cam plate (46) is contained within the cam plate housing (79) defined by the guide plate (42) including the guide flange (78). The backup ring assembly (50) is associated with the cam plate (46), as described further below, such that rotation of the cam plate (46) causes the backup ring assembly (50), and more particularly the backup shoe units (52), to move radially relative to the axis of rotation of the cam plate (46). In order for the cam plate (46) to actuate the backup shoe units (52) in this manner, and in order for the backup shoe units (52) to engage the inner wall of the pipe in the extended position, the backup shoe units (52) must pass or extend through the guide flange (78). Thus, in the preferred embodiment, the guide flange (78) defines a plurality of sleeves (80) therethrough for receiving the plurality of backup shoe units (52), as shown in FIGS. 1 and 2. In the preferred embodiment, each sleeve (80) includes a bushing (81) therein.

Actuation of the drive mechanism of the backup ring assembly (20) causes the cam plate (46) to rotate relative to the guide plate (42) about its axis of rotation. As a result of such rotation, the backup shoe units (52) are moved radially relative to the axis of rotation of the cam plate (46). The backup ring assembly (50), comprising the plurality of backup shoe units (52), may be associated with the cam plate (46) by any structure or mechanism or in any manner permitting the radial movement of the backup shoe units (52) in response to the rotation of the cam plate (46). However, preferably, the backup ring assembly (50) is associated with the cam plate (46) such that rotation of the cam plate (46) produces a camming action on the backup shoe units (52) resulting in the radial movement of the backup shoe units (52).

Figure 3:
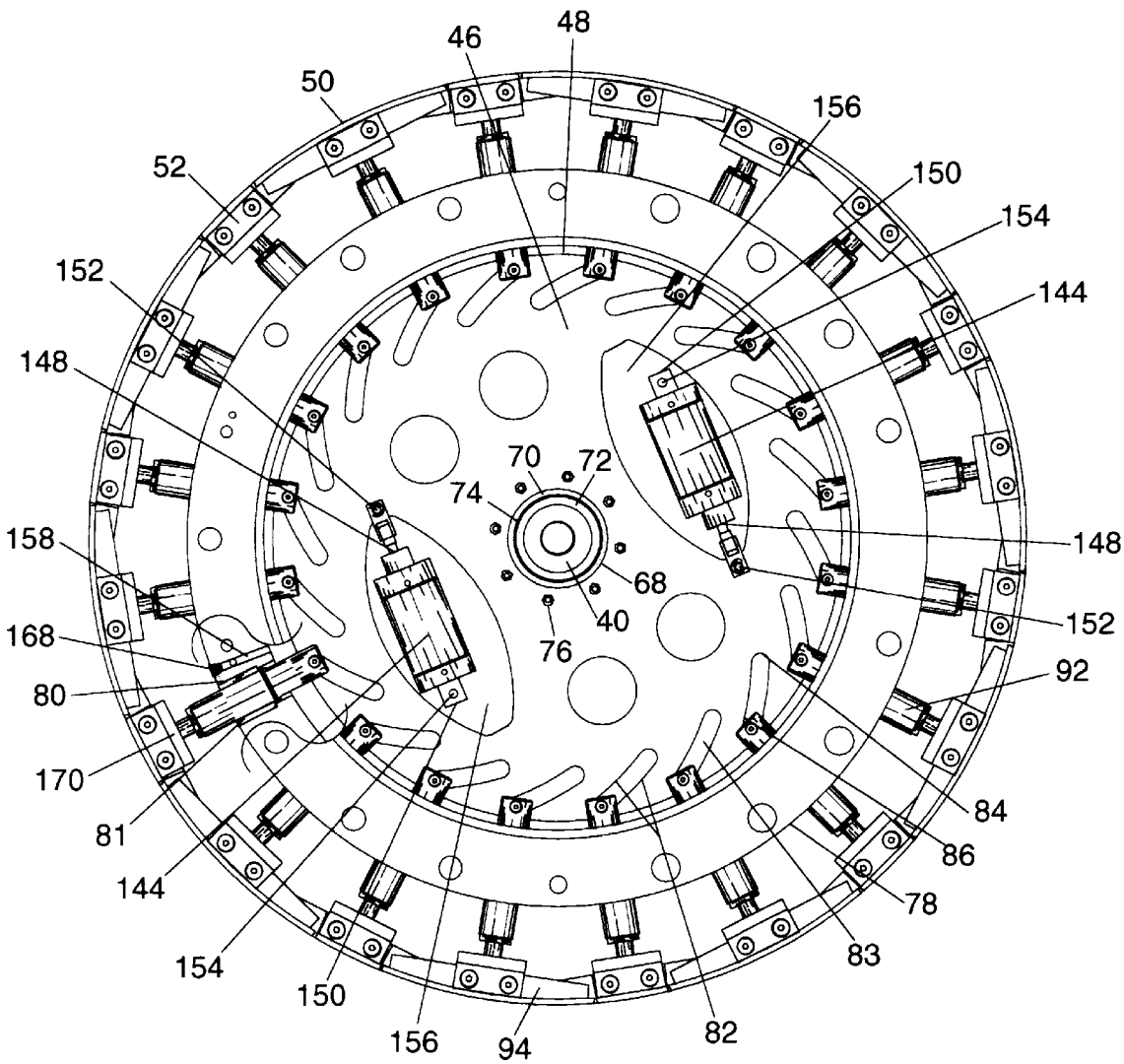
FIG. 3 is a front view of the internal backup ring system shown in FIG. 2.
Figure 4:
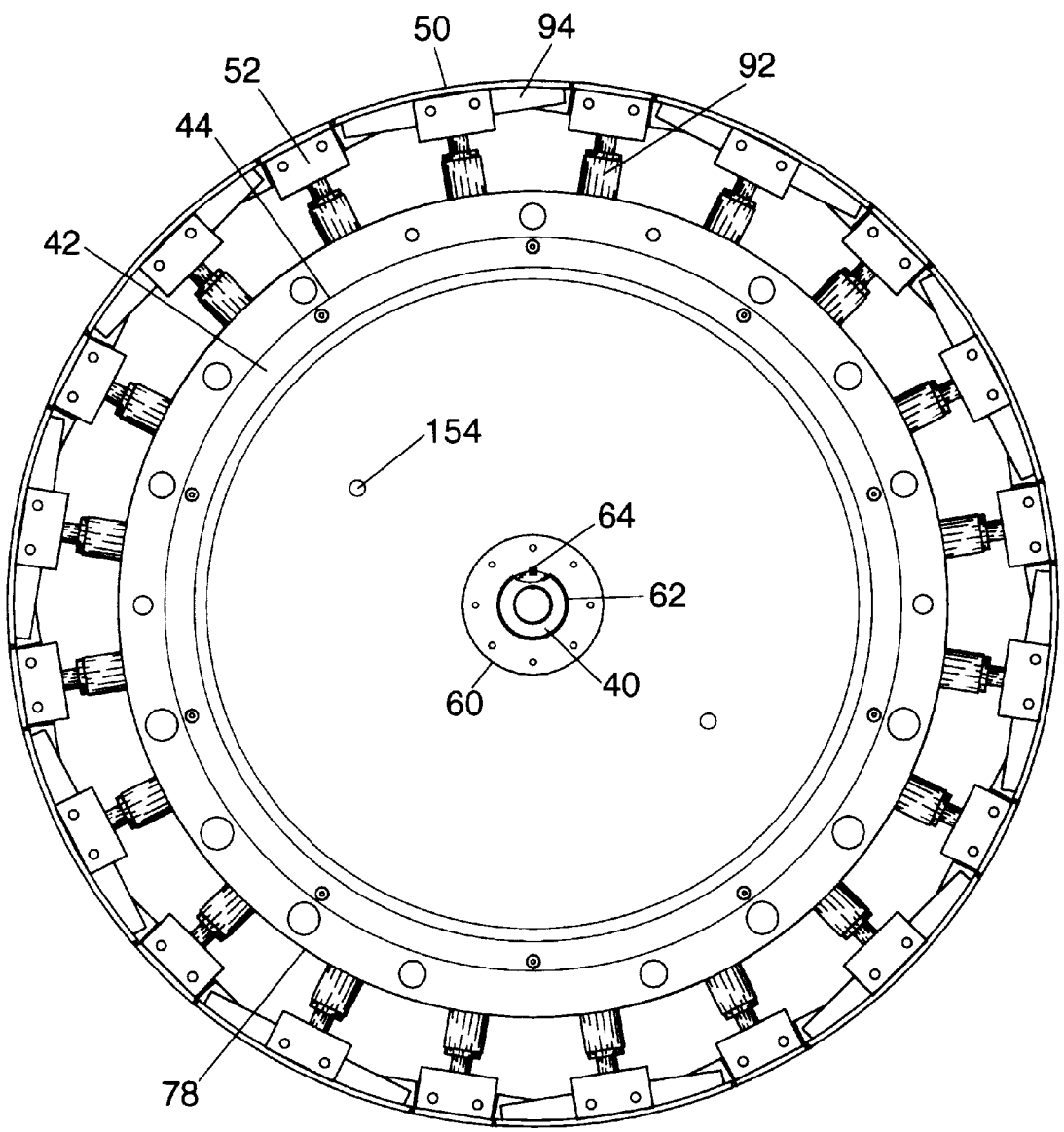
FIG. 4 is a rear view of the internal backup ring system shown in FIG. 2.

Specifically, in the preferred embodiment, the cam plate (46) comprises a plurality of camming surfaces (82) as shown in FIG. 3. The backup shoe units (52) engage the camming surfaces (82) so that rotation of the cam plate (46) causes the backup shoe units (52) to move radially relative to the axis of rotation of the cam plate (46) by moving along the camming surfaces (82). Referring to FIG. 3, the camming surfaces (82) are positioned about the perimeter (48) of the cam plate (46). Further, the camming surfaces (82) are configured to provide the desired amount of radial movement of the backup shoe units (52). In the preferred embodiment, a camming surface (82) is associated with each backup shoe unit (52). However, any alternate configuration resulting in the required camming action may be used.

As indicated, the camming surfaces (82) may have any configuration and may be formed in the cam plate (46) in any manner resulting in the required camming action. However, preferably, each of the camming surfaces (82) is comprised of a slot (83) having an innermost end (84) and an outermost end (86). The innermost end (84) is located nearer the axis of rotation of the cam plate (46) than the outermost end (86). As the backup shoe unit (52) moves along the camming surface (82), within the camming slot (83), towards the innermost end (84), the backup shoe unit (52) is moved towards the retracted position. The outermost end (86) of the camming slot (83) is located adjacent the perimeter (48) of the cam plate (46). As the backup shoe unit (52) moves along the camming surface (82), within the camming slot (83), towards the outermost end (86), the backup shoe unit (52) is moved towards the extended position.

Although the camming slot (83) may be configured to permit any amount of radial travel between the extended and retracted positions, for a 42 inch pipe the camming slot (83) preferably permits about one and one-half (1½) inches of travel of the backup shoe unit (52). In addition, for a 42 inch pipe the slope of the camming slot (83) is preferably about 30 degrees, although any other operable slope may be used. As previously described, the amount of radial travel is a function of both the amount of rotation of the cam plate (46) between the extended and retracted positions and the rate at which this rotation is converted to radial movement. By varying the length of the camming surfaces (83) as well as the amount of rotation of the cam plate (46), or by varying the slope of the camming slots (83), the radial travel of the backup shoe units (52) may be altered in order to achieve the desired amount of travel.

In the preferred embodiment, the outermost end (86) of the camming slot (83) is open, in that the slot (83) extends to the perimeter (48) of the cam plate (46), in order that the backup shoe unit (52) may be readily removed from the camming slot (83) in the event that replacement or repair of the backup shoe unit (52) is required. However, where the outermost end (86) is open, there is a risk that the backup shoe unit (52) may unintentionally pass out of the camming slot (83) through the open outermost end (86) if the backup shoe unit (52) is extended when the pipe clamping apparatus is not positioned inside a pipe so that the backup shoe unit (52) is restrained from excessive outward radial movement by the inner wall of the pipe. As a result, the outermost end (86) of the camming slot (83) may be closed by either a permanent or a removable structure or mechanism. Alternately, where it is desired that the outermost end (86) remain open, other features or mechanisms are preferably provided, as described below for the preferred embodiment of the invention, for restraining or maintaining the backup shoe unit (52) within the camming slot (83) during use of the backup ring system (20).

Any type of backup shoe unit (52) compatible with the cam plate (46) and capable of radial movement in response to the rotation thereof, may be used. However, preferably, each backup shoe unit (52) has an outer end (88) and an inner end (90). The outer end (88) of the backup shoe unit (52) is configured for engaging the inner wall of the pipe in the extended position of the backup shoe unit (52). The inner end (90) of the backup shoe unit (52) is configured for engaging the camming surface (82) of the cam plate (46) such that rotation of the cam plate (46) causes the backup shoe unit (52) to move between the retracted and extended positions.

In addition, each backup shoe unit (52) is preferably capable of a limited range of radial movement between an inner limit and an outer limit without rotation of the cam plate (46) relative to the guide plate (42). The backup shoe units (52) may comprise any structure or elements permitting the limited range of radial movement. Further, the backup shoe units preferably comprise an urging mechanism for urging the backup shoe units (52) toward the outer limit of the limited range of radial movement. Any urging mechanism or device, such as a spring, may be used. However, the preferred mechanism for providing the limited range of radial movement and the preferred urging mechanism are described in detail below.

Figure 5:
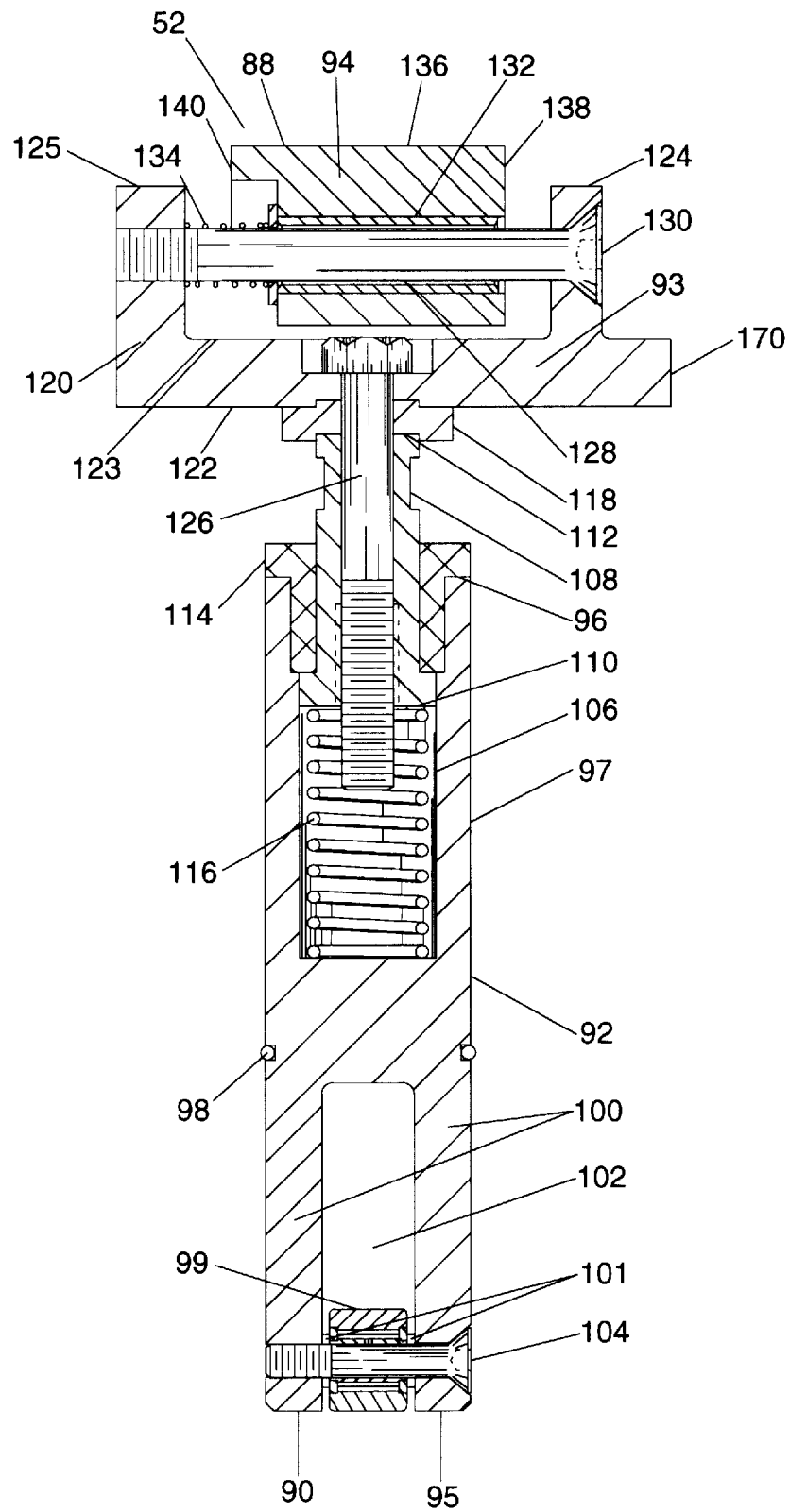
FIG. 5 is a side sectional view of the backup shoe unit shown in FIGS. 1 and 2.
Figure 7:
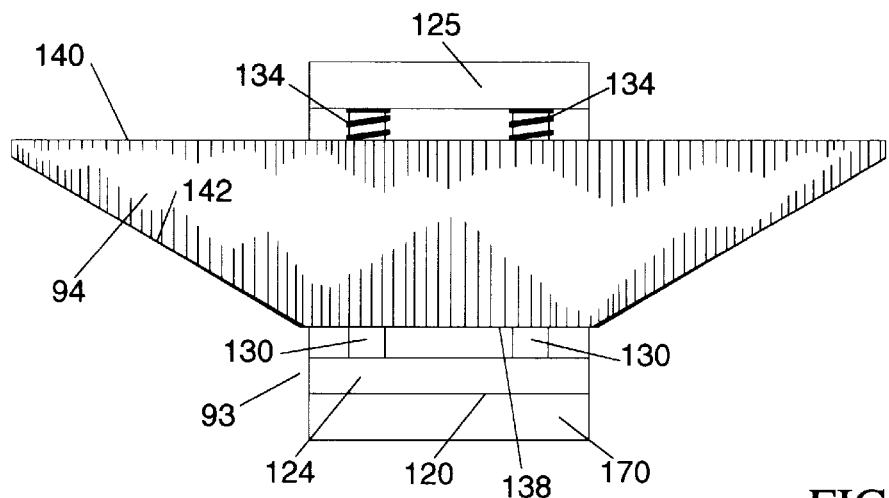
FIG. 7 is a top view of the backup shoe unit shown in FIG. 5.
Figure 6:
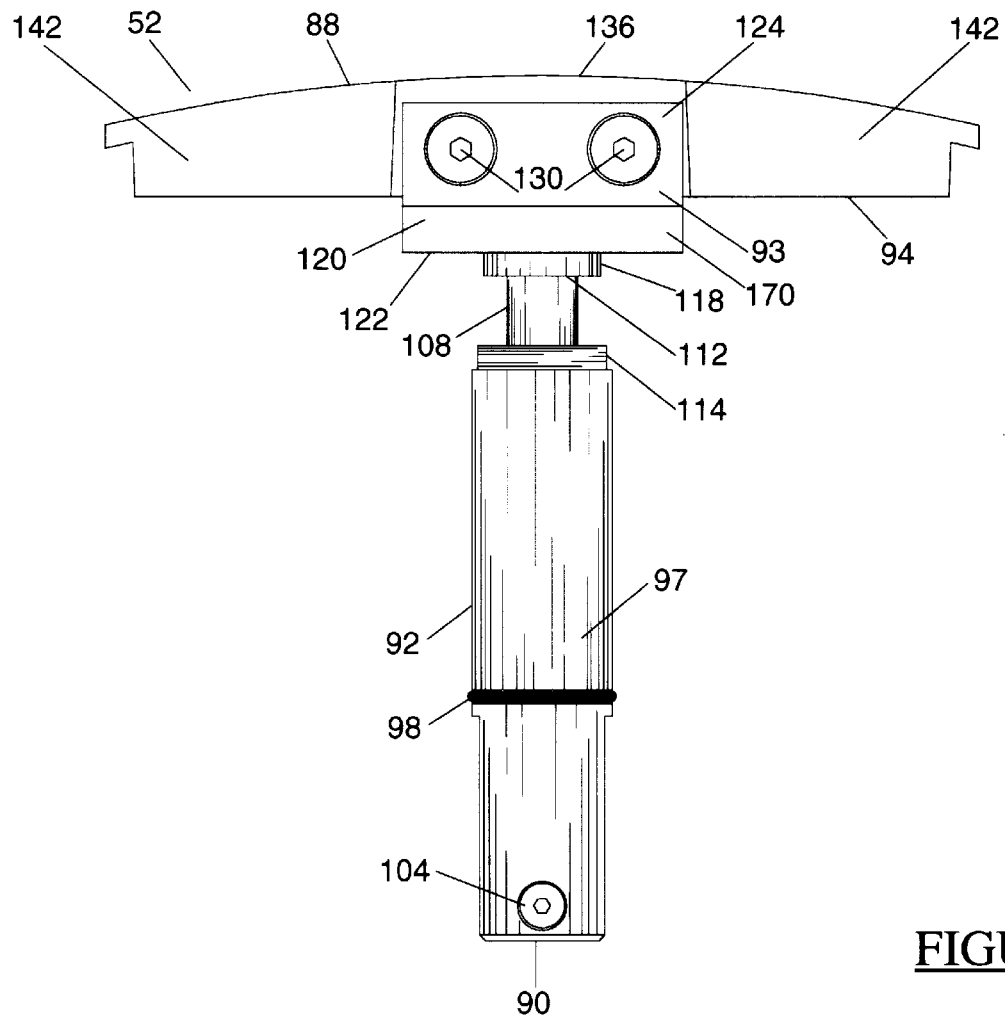
FIG. 6 is a front view of the backup shoe unit shown in FIG. 5.

Referring to FIGS. 5–7, in the preferred embodiment, each backup shoe unit (52) is comprised of a shoe deployment rod (92), a shoe carrier (93) mounted or connected with the shoe deployment rod (92) and a backup shoe (94) carried by or mounted with the shoe carrier (93). The shoe deployment rod (92) has an inner end (95), defining the inner end (90) of the backup shoe unit (52), an opposing outer end (96), a longitudinal axis extending therebetween and an outer surface (97). The inner end (95) is associated with the cam plate (46) for actuation of the shoe backup unit (52), while the outer end (96) is associated with the shoe carrier (93) for the support thereof. Preferably, the inner end (95) of the shoe deployment rod (92) is associated with the cam plate (46) in a manner such that the longitudinal axis of the shoe deployment rod (92) is substantially parallel to the plane of the cam plate (46).

Further, the shoe deployment rod (92) is configured for passage through the sleeve (80) defined by the guide flange (78). Specifically, the outer surface (97) of the shoe deployment rod (92) is in sliding contact with the bushing (81) contained within the sleeve (80). Where desired, a releasable retainer such as one or more O-rings (98) may be located on the outer surface (97) of the rod (92) to inhibit the rod (92) from falling out of the sleeve (80) when the backup shoe unit (52) is in the extended position and the pipe clamping apparatus is not positioned in a pipe. Accordingly, the cam plate (46), actuating the shoe deployment rod (92), is contained within the cam plate housing (79) defined by the guide plate (42), while the shoe carrier (93) and backup shoe (94) are positioned outside the cam plate housing (79) in both the extended and retracted positions of the backup shoe units (52), as shown in FIGS. 1 and 2.

More particularly, referring to FIGS. 5–7, the inner end (95) of the shoe deployment rod (92) comprises a cam follower (99) compatible with the camming surface (82) or camming slot (83) of the cam plate (46). Any compatible cam follower (99) may be used. However, in the preferred embodiment, as shown in FIG. 5, the inner end (95) of the shoe deployment rod (92) includes two prongs (100) defining a gap (102) therebetween. The cam follower (99), being a roller, is rotatably mounted on a suitable bearing substantially perpendicular to the longitudinal axis of the shoe deployment rod (92) in the gap (102) between the prongs (100) by a fastener such as a screw (104). Spacers (101) may be provided between the ends of the cam follower (99) and the prongs (100) to contain the bearings and facilitate tightening of the screw (104) without binding the cam follower (99).

Further, the shoe deployment rod (92) defines a bore (106), which extends to the outer end (96) of the rod (92), for accommodating at least a portion of a biasing plunger (108) therein. In particular, the biasing plunger (108) has an inner end (110), which is movably mounted or contained within the bore (106) of the shoe deployment rod (92), and an opposing outer end (112) extending from the outer end (96) of the shoe deployment rod (92) for connection with the shoe carrier (93). The biasing plunger (108) is mounted or contained within the bore (106), in a manner permitting the reciprocation therein, by a retainer cap (114) positioned about the biasing plunger (108) at the outer end (96) of the shoe deployment rod (92). However, any mechanism for maintaining or retaining the biasing plunger (108) in association with the shoe deployment rod (92) in a manner permitting the reciprocation of the plunger (108) within the bore (106) may be used.

The biasing plunger (108) is provided for connecting or mounting the outer end (96) of the rod (92) with the shoe carrier (93) such that actuation of the shoe deployment rod (92) actuates the backup shoe (94) connected with the shoe carrier (93). Further, as stated, each backup shoe unit (52) is preferably capable of a limited range of radial movement between an inner limit and an outer limit without rotation of the cam plate (46) relative to the guide plate (42). The biasing plunger (108) provides for this limited range of radial movement. Specifically, reciprocation of the biasing plunger (108) within the bore (106) of the shoe deployment rod (92) permits the backup shoe (94), connected with the shoe carrier (93), to move between the inner limit and the outer limit. At the outer limit, the inner end (110) of the biasing plunger (108) preferably engages the retainer cap (114).

This limited range of radial movement assists in establishing positive contact between the backup shoe units (52) and the inner wall of the pipe. One reason for this is that the radial travel of the backup shoe units (52) is preferably designed so that the backup shoe units will extend further from the axis of rotation of the cam plate than the clamping mechanisms (22, 24) when all are in the extended position, with the result that the biasing plunger will be depressed by the inner wall of the pipe to provide a biased engagement of the backup shoe unit with the pipe. A second reason for this is that the limited range of radial movement will permit the backup ring assembly (50) to adjust to the inner walls of pipes which are not perfectly round or which have other imperfections.

Thus, upon the rotation of the cam plate (46) in the second direction to move the backup shoe units (52) towards the retracted position, the shoe deployment rod (92) is moved radially inwards until the inner end (110) of the biasing plunger (108) engages the retainer cap (114). Thereafter, further rotation of the cam plate (46) in the second direction will cause the retainer cap (114) to act upon the biasing plunger (108) and cause the backup shoe (94) to be moved radially inward towards the retracted position.

Further, as stated, the backup shoe units (52) preferably comprise an urging mechanism for urging the backup shoe units (52) toward the outer limit of the limited range of radial movement. In the preferred embodiment, the urging mechanism is associated with the biasing plunger (108) for biasing or urging the plunger (108) to move within the bore (106) outwardly or radially in a direction towards the outer end (96) of the shoe deployment rod (92). Although any urging mechanism may be used, the urging mechanism is preferably comprised of a radial biasing spring (116) positioned within the bore (106) in communication with the inner end (110) of the biasing plunger (108).

Where desired, as discussed further below, the outer limit of the limited range of radial movement of the backup shoe units (52) may be varied or changed to either increase or decrease the outer limit. For instance, one or more shims (118), as shown in FIGS. 5 and 6, may be inserted at the outer end (112) of the biasing plunger (108) between the plunger (108) and the shoe carrier (93) in order to increase the outer limit of the backup shoe unit (52). Alternately, the length of the plunger (108) may be increased in any other manner to increase the outer limit, or conversely the length of the plunger (108) may be decreased in any manner to decrease the outer limit.

There are two primary purposes for using shims. First, shims may be inserted in each backup shoe unit (52) to adapt the backup ring assembly (50) for use with different sizes of pipe. Second, varying numbers or sizes of shims may be inserted in the backup shoe units (52) to vary the limited range of radial movement of the backup shoe units (52) so that rotation of the cam plate relative to the guide in the second direction causes the backup shoe units (52) to move radially inward in a desired sequence, thus resulting in a zippering effect of the backup shoe units (52).

Any type of shoe carrier (93) compatible with the particular backup shoe (94) and compatible with the operation of the backup shoe unit (52) as described herein may be used. Preferably, the shoe carrier (93) is comprised of a U-shaped carrier member (120), as shown in FIGS. 5 and 7, having a lower surface (122), an upper surface (123) and front and rear arms (124, 125) extending from the upper surface (124) forming the U-shape. The lower surface (122) of the carrier member (120) is associated with the outer end (96) of the shoe deployment rod (92). Preferably, the lower surface (122) of the carrier member (120) is mounted or connected with the outer end (112) of the biasing plunger (108), or any shims (118) connected thereto. However, the carrier member (120) and the biasing plunger (108) may be connected in any other operable manner. Further, the lower surface (122) of the carrier member (120) may be integrally formed with the outer end (112) of the biasing plunger (108) and any shims (118). However, preferably, the lower surface (122) of the carrier member (120) is connected or mounted with the outer end (112) of the biasing plunger (108), or any shims (118), using a fastener or method for fastening adjacent surfaces. In the preferred embodiment, the lower surface (122) of the carrier member (120) is mounted with the outer end (112) of the biasing plunger (108), and any intervening shims (118), by a fastener, such as a bolt (126) extending from the lower surface (122) of the carrier member (120) into the biasing plunger (108) as shown in FIG. 5.

As indicated, the backup shoe (94) is connected or mounted with the shoe carrier (93). The backup shoe (94) may be connected with the shoe carrier (93) in any manner and by any connectors, fasteners or connection or fastening methods or processes which are compatible with the operation of the backup shoe unit (52) as described herein. However, preferably, the backup shoe (94) is connected or mounted adjacent the upper surface (123) of the carrier member (120) such that it is received or partially contained within the arms (124, 125) of the carrier member (120) forming the U-shape. The backup shoe (94) may be integrally formed with the carrier member (120), however, preferably the backup shoe (94) is movably mounted between the arms (124, 125) such that an amount of axial movement of the backup shoe (94) between the arms (124, 125) is permitted. Thus, the backup shoe (94) is movable in a radial direction, between the extended and retracted positions of the backup shoe unit (52), as a result of the actuation of the backup shoe unit (52) by the rotation of the cam plate (46) about its axis of rotation. Further, the backup shoe (94) is preferably movable in an axial direction substantially perpendicular to the longitudinal axis of the shoe deployment rod (92) or substantially perpendicular to the direction of the radial movement of the shoe backup unit (52).

In the preferred embodiment, each backup shoe (94) defines one or more passages (128), preferably two, therethrough for the mounting of the backup shoe (94) between the arms (124, 125) of the carrier member (120). The backup shoe (94) is positioned, at least in part, within the U-shape formed by the arms (124, 125) of the carrier member (120) adjacent the upper surface (123). A fastener such as a screw (130) extends between the arms (124, 125) through each passage (128) defined by the backup shoe (94). The backup shoe (94) is reciprocally movable on the screws (130) between the arms (124, 125) in the axial direction. In order to facilitate the axial movement, each passage (128) may include a bushing (132) therein.

Further, the backup shoe (94) is preferably biased or urged axially toward one of the arms (124, 125) of the carrier member (120). Any biasing or urging mechanism may be used. However, in the preferred embodiment, an axial biasing spring (134) is positioned about each screw (130) between the backup shoe (94) and one of the adjacent arms (124, 125) of the carrier member (120), as shown in FIGS. 5 and 7. As described further below, the axial biasing springs (134) are intended to urge the adjacent ends of the backup shoes (94) in each adjacent backup shoe unit (52) towards each other when the backup ring system (20) is assembled and positioned for use in the pipe clamping apparatus. Thus, in the preferred embodiment, the axial biasing springs (134) are positioned in each backup shoe unit (52) between the backup shoe (94) and alternately between the front arm (124) and the rear arm (125) of the carrier member (120). For instance, as shown in FIGS. 5 and 7, the axial biasing spring (134) is positioned between the backup shoe (94) and the front arm (124) of the carrier member (120) such that the backup shoe (94) is urged radially rearward towards the rear arm (125). The axial biasing springs (134) in each of the backup shoe units (52) adjacent to the backup shoe unit (52) shown in FIG. 5 are positioned between the backup shoe (94) and the rear arm (125) such that the adjacent backup shoes (94) are urged radially forward towards the front arm (124).

The backup shoe (94) may have any shape or configuration compatible with the operation of the backup shoe unit (52) as described herein and compatible with the inner wall of the pipe to be welded. Specifically, each backup shoe (94) is configured such that the backup shoes (94) may be arranged circumferentially to form the backup ring assembly (50) of the backup ring system (20) and to provide a substantially continuous outer surface at various diameters of the backup ring assembly (50). Further, the backup shoe (94) configuration is compatible with the inner wall of the pipe to be welded such that each of the backup shoes (94) may engage the inner wall of the pipe when the backup shoe units (52) are moved radially outward to the extended position. The configuration of each backup shoe (94) also permits the backup shoe units (52) to be moved radially inwards towards the retracted position.

In the preferred embodiment, when viewed from the front, as shown in FIG. 6, the backup shoe (94) has an arcuate outer surface (136) for engaging the inner wall of the pipe. The outer surface (136) of the backup shoe (94) defines the outer end (88) of the backup shoe unit (52). Thus, the specific shape of the outer surface (136) and the degree of the arc formed thereby are compatible with the pipe to be welded. Further, when viewed from the top, as shown in FIG. 7, the backup shoe (94) forms a trapezoid having a shorter axial side (138) and a parallel longer axial side (140) and having non-parallel end sides (142) extending therebetween. Preferably, the end sides (142) are equal and opposite such that the backup shoe (94) forms an isosceles trapezoid when viewed from the top. The backup shoes (94) are arranged in the backup ring assembly (50) to face in opposite directions. In other words, in the backup shoe (94) shown in FIG. 7, the longer axial side (140) faces forwards towards the front of the pipe clamping apparatus. The longer axial sides (140) of the backup shoes (94) adjacent to the backup shoe (94) shown in FIG. 7 face rearwards towards the rear of the pipe clamping apparatus. The direction of the longer axial side (140) is alternated between adjacent backup shoes (94) throughout the backup ring assembly (50) so that the adjacent end sides (142) of adjacent backup shoes (94) may slidingly engage each other.

Further, in the preferred embodiment, as discussed above, the axial biasing spring (134) is positioned between the longer axial side (140) of the backup shoe (94) and one of the adjacent arms (124, 125) of the carrier member (120). The axial biasing spring (134) acts upon the longer axial side (140) so that the adjacent end sides (142) are urged into sliding contact with each other constantly during the movement of the backup shoe units (52) between the extended and retracted positions. As the direction of the longer axial side (140) is alternated between adjacent backup shoes (94), the axial biasing spring (134) is positioned between the longer axial side (140) of the backup shoe (94) and alternately between the front arm (124) and the rear arm (125) of the carrier member (120). For instance, as shown in FIGS. 5 and 7, the axial biasing spring (134) is positioned between the longer axial side (140) and the front arm (124) of the carrier member (120) such that the backup shoe (94) is urged radially rearward towards the rear arm (125). The axial biasing springs (134) in the adjacent backup shoe units (52) are positioned between the longer axial side (140) and the rear arm (125) such that the adjacent backup shoes (94) are urged radially forward towards the front arm (124).

Each backup shoe (94) may be comprised of any material compatible with its use as a backup surface for the welding of the adjacent ends of the pipe. Preferably, at least the outer surface (136) of the backup shoe (94) is comprised of copper. In the preferred embodiment, the entire backup shoe (94) is comprised of solid copper.

The drive mechanism for the backup ring system (20) may be comprised of any mechanism, apparatus or device capable of coupling the guide plate (42) and the cam plate (46) and able to rotate the cam plate (46) relative to the guide plate (42) about the axis of rotation of the cam plate (46). As well, as discussed above, the drive mechanism may be actuatable in conjunction with, or independently of either or both of the front and rear clamping mechanisms (22, 24). However, preferably, the drive mechanism may be actuated independently of both the front and rear clamping mechanisms (22, 24).

Referring to FIG. 3, in the preferred embodiment, the drive mechanism is comprised of at least one ram (144), and preferably two, operably coupling the guide plate (42) and the cam plate (46) such that actuation of the ram (144) causes the cam plate (46) to rotate relative to the guide plate (42) about its axis of rotation. The ram (144) may be coupled to the guide and cam plates (42, 46) in any manner permitting such operation. However, preferably, each ram (144) is mounted on the guide plate (42) and is operatively connected with the cam plate (46) such that extension and retraction of the ram (144) cause rotation of the cam plate (46) relative to the guide plate (42).

Further, the drive mechanism is preferably double acting, in that the cam plate (46) is positively rotated in the first direction to extend the backup shoe units and is positively rotated in the second direction to provide a primary retraction mechanism and a retraction force. Thus, the backup shoe units (52) are positively moved between the extended and retracted positions. Therefore, in the preferred embodiment, each of the rams (144) are double acting. As a result, the powering means for the ram (144) is operative to cause the cam plate (46) to rotate relative to the guide plate (42) in the first direction to move the backup shoe units (52) towards the extended position and is also operative to cause the cam plate (46) to rotate relative to the guide plate (42) in the second direction to move the backup shoe units (52) towards the retracted position. Thus, the backup shoes (94) may be physically retracted from their contact with the inner wall of the pipe following the completion of the welding operation.

As stated, each ram (144) is mounted on the guide plate (42) and is operatively connected with the cam plate (46) such that extension and retraction of the ram (144) cause rotation of the cam plate (46) relative to the guide plate (42). Each ram (144) may be mounted or connected with the guide and cam plates (42, 46) respectively in any manner and by any mounting or connection mechanism, and may have any location or position relative to the guide and cam plates (42, 46), compatible with the function of the ram (144) as described herein. However, in the preferred embodiment, the guide plate (42) and the cam plate (46) define a ram space (146) therebetween. Each ram (144) is preferably contained at least partly in the ram space (146).

Further, each ram (144) has a free end (148) and a fixed end (150). One of the ends (148, 150) of the ram (144) is associated with one of the cam plate (46) or the guide plate (42). For instance, the free end (148) may be associated with the guide plate (42) and the fixed end (150) may be associated with the cam plate (46). However, in the preferred embodiment, as shown in FIG. 3, the free end (148) is associated with the cam plate (46) and the fixed end (150) is associated with the guide plate (42). The ends (148, 150) of the ram (144) may be associated with their respective plates (46, 42) in any manner and by any mechanism or structure such that extension and contraction of the ram (144) causes rotation of the cam plate (46) relative to the guide plate (42). In the preferred embodiment, the free end (148) is operatively connected to the cam plate (46) by a rod clevis and pin mechanism (152). More particularly, the free end (148) is connected to the surface of the cam plate (46) facing the front end of the pipe clamping apparatus. The fixed end (150) is mounted on the guide plate (42) by a mount pin mechanism (154). More particularly, the fixed end (150) is mounted on the surface of the guide plate (42) facing the front end of the pipe clamping apparatus. Thus, as shown in FIG. 3, the cam plate (46) preferably defines a ram aperture (156) for receiving the ram (144) or a portion thereof such that the ram (144) may extend therethrough. As a result, in the preferred embodiment, when the ram (144) is mounted in the described manner, the ram (144) is contained partly in the ram space (146) and extends through the ram aperture (156) for connection to the cam plate (46).

The extension and contraction of the rams (144) causes rotation of the cam plate (46) about its axis of rotation relative to the guide plate (42). The cam plate (46), including the camming surfaces (82), and the rams (144) may be configured such that either the extension or contraction of the ram (144) may cause the rotation of the cam plate (46) in either the first or second directions to move the backup shoe units toward the extended or retracted positions respectively. However, in the preferred embodiment, as shown in FIG. 3, extension of the ram (144) causes the rotation of the cam plate (46) in the second direction to move the backup shoe units (52) towards the retracted position. Conversely, contraction of the ram (144) causes the rotation of the cam plate (46) in the first direction to move the backup shoe units (52) towards the extended position.

The power source for driving the drive mechanism may be comprised of any mechanism, apparatus, device or motor capable of powering or actuating the particular drive mechanism comprising the backup ring system (20). For instance, the power source may be pneumatic, hydraulic, electric or even internal combustion. However, preferably, the power source is the same as, or compatible with, the power or drive mechanism for the front and rear clamping mechanisms (22, 24) of the pipe clamping apparatus. As conventional pipe clamping apparatus typically include an air tank or other air source for driving the front and rear clamping mechanisms (22, 24), the power source of the backup ring system (20) is pneumatic in the preferred embodiment. Accordingly, in the preferred embodiment, each of the rams (144) is pneumatically powered.

In order for the rams (144) to be pneumatically powered in the preferred embodiment, the air source must be connectable to, or able to communicate with, the rams (144). Preferably, the air source is connectable to, or communicates with, the rams (144) within the cam plate housing (79). Although the air source may be connectable or communicable in any manner with the rams (144), in the preferred embodiment, the air supply passes through the guide flange (78) such that the air supply is conducted inside the cam plate housing (79). Preferably, the guide flange (78) defines at least one passage (158), as shown in FIGS. 1, 2 and 3, for conducting the air supply or other powering means therethrough. The guide flange (78) preferably has an inner surface (160), an opposing outer surface (162) and two opposing side surfaces (164) adjacent the front and rear clamping mechanisms (22, 24). The passage (158) preferably extends from the inner surface (160) of the guide flange (78) to at least one of the outer surface (162) or one or both of the side surfaces (164).

The end of the passage (158) adjacent the inner surface (160) is connectable or communicable with the ram (144) by an air hose or other air supply or connector mechanism. The other end of the passage (158) adjacent the outer or side surfaces (162, 164) is connectable or communicable with the air source by an air hose or other air supply or connector mechanism. As a result, the powering means may pass from outside the cam plate housing (79), into the cam plate housing (79) through the passage (158), and to the ram (144) so that the ram (144) may be powered thereby. The specific design and configuration of the passage (158) will be dependent upon, amongst other factors, the type and location of the power source and the overall design of the pipe clamping apparatus.

Where it is desirable that the passage (158) extends to either of the side surfaces (164) of the guide flange (78), the power source may need to be conducted through the adjacent front or rear clamping mechanism (22, 24). As a result, the adjacent portion of the front or rear clamping mechanism (22, 24) may similarly define a passage (166) compatible with the passage (158) through the guide plate (78) such that the passages (158, 166) are connectable or may communicate with each other in a manner permitting the powering means, such as an air supply, to pass therethrough. Where the passage (158) extends to either of the side surfaces (164) of the guide flange (78), when retrofitting the backup ring system (20) to an existing pipe clamping apparatus, the portion of the front or rear clamping mechanism (22, 24) adjacent the side surface (164) may need to be modified or replaced with a portion defining a compatible passage (166) in order that the powering means may be connected or communicate with the drive mechanism, i.e. the rams (144) of the backup ring system (20).

In the preferred embodiment, as shown in FIG. 1, the passage (158) extends from the inner surface (160) to both the outer surface (162) and the side surface (164) adjacent the front clamping mechanism (22). A removable plug (168) is positioned in the passage (158) at the outer surface (162) such that the air conducted through the guide flange (78) passes only between the side surface (164) adjacent the front clamping mechanism (22) and the inner surface (160). The passage (158) is connected to a compatible passage (166) defined by the front clamping mechanism (22).

Preferably, the backup shoe units (52) are positively retracted from the inner wall of the pipe by the application of a retraction force by the primary retraction mechanism, which in the preferred embodiment is comprised of the double acting ram (144). The actual retraction force required to be applied by the ram (144) will vary depending upon a number of factors, including the shape of the trapezoid forming the backup shoes (94), the angle of the camming surface (82), the composition of and thus the friction between adjacent moving surfaces, the force of the axial biasing spring (134), and the amount of adhesion between the backup shoes and the inner wall of the pipe. Other primary retraction mechanisms such as springs may also be used. Preferably the primary retraction mechanism is associated with the drive mechanism.

Preferably, however, the backup ring system (20) also includes auxiliary means for dislodging the backup ring assembly (50) when at least one of the backup shoe units (52) is stuck to the inner wall of the pipe in the extended position and the retraction force provided by the ram (144) is insufficient to dislodge the backup shoe unit (52) on its own. Any mechanism, structure, device or method capable of dislodging the backup ring assembly (50) may be used as the auxiliary dislodging means.

For example, the cam plate (46) may define a central axis. Further, the axis of rotation of the cam plate (46) may be offset from the central axis. As a result of the offsetting or eccentric orientation, rotation of the cam plate (46) relative to the guide plate (42) in the second direction causes the backup shoe units (52) to move radially inward sequentially toward the retracted position. As a result, a zippering effect of the backup shoe units (52) is achieved.

More particularly, rotation of the guide plate (42) in the second direction causes the backup shoe units (52) to sequentially reach the outer limit of the limited range of radial movement of the backup shoe unit (52). In other words, the shoe deployment rods (92) are sequentially retracted, which causes the inner ends (110) of the biasing plungers (108) to sequentially contact or engage their respective retainer caps (114). Upon the engagement of the inner end (110) of the biasing plunger (108) and the retainer cap (114), the backup shoe (94) connected with the biasing plunger (108) will be moved towards the retracted position, away from the inner wall of the pipe. The sequential retraction of the backup shoes (52) results in the retraction force generated by the drive mechanism being applied to only a limited number of backup shoe units (52) concurrently. Preferably, the retraction force is only applied to one or two backup shoe units (52) at a time.

Alternatively, the outer limit of the limited range of radial movement of the backup shoe units (52) may be varied in order to achieve a similar zippering effect. As a result of the variation of the outer limit of the limited range of radial movement of the backup shoe units (52), rotation of the cam plate (46) relative to the guide plate (42) in the second direction similarly causes the backup shoe units (52) to move radially inward sequentially toward the retracted position as the backup shoe units (52) sequentially reach their respective outer limits of the limited range of radial movement.

As discussed above, the outer limit of the limited range of radial movement may be varied in any manner. For instance, the length of the plunger (108) may be increased in any manner to increase the outer limit, or the length of the plunger (108) may be decreased in any manner to decrease the outer limit. Preferably, the outer limit is varied by inserting one or more shims (118) in the backup shoe units (52) to increase the outer limit, as shown in FIGS. 5 and 6. Specifically, a shim (118) is preferably inserted at the outer end (112) of the biasing plunger (108) between the plunger (108) and the shoe carrier (93) in order to increase the outer limit of the backup shoe unit (52).

As a result, rotation of the cam plate (46) in the second direction causes the backup shoe units (52) to sequentially reach the varied outer limits of the limited range of radial movement of the backup shoe units (52). As with offsetting, as described above, the shoe deployment rods (92) are sequentially retracted, which causes the inner ends (110) of the biasing plungers (108) to sequentially contact or engage their respective retainer caps (114). Upon the engagement of the inner end (110) of the biasing plunger (108) and the retainer cap (114), the backup shoe (94) connected with the biasing plunger (108) will be moved towards the retracted position, away from the inner wall of the pipe. The sequential retraction of the backup shoes (52) results in the retraction force generated by the drive mechanism being applied to a limited number of backup shoe units (52) concurrently. Backup shoe units (52) with the least range of radial movement or with the smallest outer limit will be retracted first upon the rotation of the cam plate (46), while backup shoe units (52) with the most range of radial movement or the greatest outer limit will be retracted last. Thus, the pattern of retraction within the backup ring assembly (50), and the number of backup shoe units (52) to be retracted concurrently, may be selected or designed as desired by selecting the size or number of shims to be inserted in any particular backup shoe unit (52).

A further alternative for creating a sequential retraction of the backup shoe units (52) and thus a zippering effect is to vary the configuration of the camming surfaces (82) on the cam plate (46) so that the backup shoe units (52) reach the outer limit of their limited range of radial movement at different times during rotation of the cam plate (46). This is preferably accomplished by varying one or more of the shape or slope of the camming surfaces (82) or the distance of the camming surfaces (82) from the axis of rotation of the cam plate (46). Most preferably, however, the slope of the camming surfaces (82) is constant for each of the backup shoe units (52) so that the backup shoe units (52) will extend and retract at the same rate.

For example, one or more of the camming surfaces (82) may have one or more arc portions having a constant distance from the axis of rotation of the cam plate (46) and one or more slope portions having a varying distance from the axis of rotation of the cam plate (46) so that rotation of the cam plate (46) causes radial movement of the respective backup shoe unit (52) only when the backup shoe unit (52) is located on a slope portion of the camming surface (82). Where more than one arc portion is provided, their positions on the camming surfaces (82) may be varied while maintaining a constant total length and slope of the slope portions for each of the camming surfaces (82) in order to provide both the zippering effect and equal extension and retraction and rate of extension and retraction for each backup shoe unit (52).

Alternatively, all of the camming surfaces (82) may have the same length, shape and slope but may be positioned at different radial distances from the axis of rotation of the cam plate (46) so that the backup shoe units (52) extend and retract at the same rate, but have varying radial distances from the axis of rotation of the cam plate (46) when they are in the extended and retracted positions. A combination of varying the shape or slope of the camming surfaces (82) or their distance from the axis of rotation of the cam plate (46) may also be used to achieve a desired zippering effect.

However, in the preferred embodiment, the auxiliary dislodging means is comprised of an engagement surface on at least one of the backup shoe units (52). The engagement surface may have any shape or configuration compatible with its intended function of dislodging the backup ring assembly (50). However, preferably, the engagement surface is comprised of at least one tab (170) associated with at least one of the backup shoe units (52), as shown in FIGS. 1, 2 and 5. Preferably, a tab (170) is associated with each of the backup shoe units (52) comprising the backup ring assembly (50). Further, the tab (170) may be comprised of any portion or element of the backup shoe unit (52) which may be engaged with the clamping mechanisms (22, 24). Preferably, the tab (170) is comprised of or associated with the shoe carrier (93) of the backup shoe unit (52), and in particular, the U-shaped carrier member (120). The tab (170) may be connected or mounted with the carrier member (120) in any manner, however preferably, the tab (170) is integral with the carrier member (120).

The engagement surface or tab (170) may engage either or both of the front or rear clamping mechanisms (22, 24). For instance, when the backup shoe unit (52) is not in the retracted position, the tab (170) may engage the rear clamping mechanism (24) in response to the inward radial movement of the rear clamping mechanism (24) in order to urge the backup shoe unit (52) radially inward toward the retracted position. In this case, the tab (170) is preferably associated with the rear arm (125 of the carrier member (120). However, preferably, as shown in FIG. 1, when the backup shoe unit (52) is not in the retracted position, the tab (170) engages the front clamping mechanism (22) in response to the inward radial movement of the front clamping mechanism (22) in order to urge the backup shoe unit (52) radially inward toward the retracted position. In this case, the tab (170) is associated with the front arm (124) of the carrier member (120).

More particularly, the tab (170) is engaged by a corresponding compatible tab (172) associated with the adjacent surface of the front clamping mechanism (22). The compatible tab (172) may be comprised of any portion or element of the front clamping mechanism (22) which may be engaged with the tab (170). Preferably, the compatible tab (172) is comprised of or associated with the front clamping shoe unit (32). The compatible tab (172) may be connected or mounted with the front clamping shoe unit (32) in any manner, however preferably, the compatible tab (172) is integral with the front clamping shoe unit (32). As the compatible tab (172) of the front clamping mechanism (22) is retracted, it hammers down on or applies a retraction force to the tab (170) of the backup shoe unit (52).

Preferably, the tab (170) of the backup shoe unit (52) and the compatible tab (172) of the front clamping mechanism

(22) are configured such that the tabs (170, 172) only engage upon the sticking of the backup shoe (94) to the inner wall of the pipe. Thus, the tab (170) acts as a fail safe mechanism only and is not operable when the backup shoes (94) are not stuck to the inner wall. Further, the tab (170) of the backup shoe unit (52) and the compatible tab (172) of the front clamping mechanism (22) are preferably configured so that the front clamping mechanism (22) engages the backup shoe unit (52) near the end of the range of movement of the front clamping mechanism (22), or near the end of its travel, towards its retracted position. As well, the tabs (170, 172) are configured such that the engagement of the tabs (170, 172) causes the backup shoe unit (52) to be moved towards its retracted position without causing any damage to the backup shoe unit (52), the cam plate (46) or the cam follower (99). In other words, the tabs (170, 172) are configured such that their engagement will not cause the inner end (110) of the biasing plunger (108) to fully compress the radial biasing spring (116). In the preferred embodiment, for a 42 inch pipe the front clamping mechanism (22) engages the backup shoe unit (52) only for about the last one quarter (¼) inch of travel of the front clamping mechanism (22) toward its retracted position.

In addition, the tabs (170, 172) are preferably configured to restrain or maintain the backup shoe unit (52) within the camming slot (83) during use of the backup ring system (20), either in addition to or in substitution for the O-ring retainer (98). Specifically, the tab (172) on the front clamping mechanism (22), and its engagement with the tab (170) on the backup shoe unit (52), limits the permissible amount of outward radial movement of the backup shoe unit (52). Thus, when the backup ring system (20) is deployed, the amount of outward or radial movement of the cam follower (99) in the camming slot (83) is also limited. The tabs (170, 172) are configured so that upon the movement of the backup shoe unit (52) to the extended position, the tabs (170, 172) are engaged to limit any further movement prior to the cam follower (99) reaching the outermost end (86) of the camming slot (83).

Finally, any methods, processes, apparatus or devices may be used for aligning the pipe clamping apparatus relative to the pipe so that the internal backup ring system engages the inner wall of the pipe at an end of the pipe to be welded. This axial alignment mechanism (not shown) may be comprised of any axial alignment mechanism or dog latch able to properly align the backup ring system (20) in the pipe.

The backup ring system (20) as described herein is preferably designed to be easily or readily retrofitted to an existing pipe clamping apparatus. Preferably, the existing centering shaft of the pipe clamping apparatus is removed. The backup ring system (20) is then inserted between the front and rear clamping mechanisms (22, 24) of the pipe clamping apparatus such that the existing centering shaft is replaced with the centering shaft (40) of the backup ring system (20). The power source of the backup ring system (20) is then connected with the drive mechanism.

As discussed above, in the preferred embodiment, in order that the power source may be connected or communicate with the drive mechanism (i.e. the rams (144), of the backup ring system (20)) the portion of the front clamping mechanism (22) adjacent the side surface (164) of the guide flange (78) may need to be modified or replaced with a portion defining a passage (166) compatible with the passage (158) through the guide plate (42)).

As well, in order to use the backup ring system (20) within pipes of varying diameters, the cam plate (46) may need to be replaced with a cam plate (46) having a size and configuration compatible with the particular pipe in which it is to be used. Further, the backup shoe (94) in each backup shoe unit (52) may need to be replaced with a backup shoe (94) having an outer surface (136) compatible with the inner wall of the particular pipe. Shims may also be required to be inserted into or removed from the backup shoe units (52).

To operate the backup ring system (20), the backup ring assembly (50), the front clamping mechanism (22) and the rear clamping mechanism (24) may be actuated to engage the inner wall of the pipe in any order or sequence. Similarly, the backup ring assembly (50), the front clamping mechanism (22) and the rear clamping mechanism (24) may be retracted from the inner wall in any order or sequence. This flexibility is possible, at least in part, as a result of the ability to actuate the drive mechanism of the backup ring system (20) independently of the front and rear clamping mechanisms (22, 24). However, preferably, when engaging the inner wall of the pipe for the welding operation, the rear clamping mechanism (24) is extended first and then the front clamping mechanism (22). Finally, the backup ring assembly (50) is moved towards the extended position. To disengage the inner wall, the operation is reversed. First, the backup ring assembly (50) is moved towards the retracted position. The front and rear clamping mechanisms (22, 24) may then be retracted in any desired order.

More particularly, in the preferred embodiment, the rear end of the pipe clamping apparatus is placed into the rear pipe section to be welded, with each of the backup ring assembly (50), the front clamping mechanism (22) and the rear clamping mechanism (24) in their retracted positions. The pipe clamping apparatus is then properly oriented in the pipe and the carrier wheel assemblies are engaged. The pipe clamping apparatus is then moved rearward into the rear pipe section by the clamp drive assembly until the axial alignment mechanism (not shown) engages the end of the pipe in order to align the backup ring assembly (50) with the end of the rear pipe section.

The rear clamping shoe units (38) of the rear clamping mechanism (24) are then moved to the extended position. The front pipe section to be welded is placed over the front end of the pipe clamping apparatus about the nose guide until the front pipe section abuts against the rear pipe section. The front and rear pipe sections are preferably spaced a desired distance apart to form a gap for the welding operation. Once the desired spacing is achieved, the front clamping shoe units (32) of the front clamping mechanism (22) are moved to the extended position.

The backup ring assembly (50) is moved towards the extended position once the front and rear clamping shoes are engaged with the inner wall. Once in the extended position, the adjacent pipe sections are welded.

Upon completion of the welding operation, the backup ring assembly (50) is moved towards the retracted position. Both the front and rear clamping shoes of the front and rear clamping mechanisms (22, 24) are then also moved by the ram (144) towards the retracted position away from the inner wall of the pipe. In the event that the retraction force provided by the ram (144) is insufficient on its own to dislodge the backup shoe units (52) from the inner wall of the pipe, the tabs (170, 172) on the backup shoe units (52) and the front clamping mechanism (22) respectively engage each other as the front clamping mechanism (22) is retracted to force the backup ring assembly (50) radially inward.

The pipe clamping apparatus is moved forwards in the pipe toward the next pipe end following the retraction of the backup ring assembly (50) and the front and rear clamping mechanisms (22, 24) for welding of the next joint. The pipe clamping apparatus is moved forwards in the pipe until such time that the axial alignment mechanism (not shown) extends from the end of the pipe. The pipe clamping apparatus is then moved rearward back into the pipe such that the axial alignment mechanism (not shown) engages the end of the pipe and thereby aligns the backup ring assembly (50) with the next end to be welded. Once the pipe clamping apparatus is properly aligned, the operation as described above is repeated.

What is claimed is:

1. An actuation system for use in a pipe clamping apparatus, the system comprising:
   (a) a guide;
   (b) a cam plate positioned adjacent to the guide and rotatable relative to the guide;
   (c) a drive mechanism coupling the guide and the cam plate such that actuation of the drive mechanism causes the cam plate to rotate relative to the guide about an axis of rotation;
   (d) a power source for driving the drive mechanism; and
   (e) a clamping assembly associated with the cam plate such that rotation of the cam plate relative to the guide causes the clamping assembly to move radially relative to the axis of rotation of the cam plate.

2. The system as claimed in claim 1 further comprising a clamping assembly associated with the cam plate such that rotation of the cam plate relative to the guide causes the clamping assembly to move radially relative to the axis of rotation of the cam plate.

3. The system as claimed in claim 1 wherein the clamping assembly comprises a backup ring assembly and wherein the actuation system is adapted to be mounted between a front clamping mechanism and a rear clamping mechanism in the pipe clamping apparatus.

4. The system as claimed in claim 3 wherein the backup ring assembly comprises a plurality of backup shoe units.

5. The system as claimed in claim 4 wherein the cam plate comprises a plurality of camming surfaces and wherein the plurality of backup shoe units engage the camming surfaces so that rotation of the cam plate causes the backup shoe units to move radially relative to the axis of rotation of the cam plate by moving along the camming surfaces.

6. The system as claimed in claim 5 wherein rotation of the cam plate relative to the guide in a first direction causes the backup shoe units to move radially outward toward an extended position for engaging an inner wall of a pipe and wherein rotation of the cam plate relative to the guide in a second direction causes the backup shoe units to move radially inward toward a retracted position.

7. The system as claimed in claim 6 wherein the guide is adapted to be fixedly connected to the pipe clamping apparatus so that the guide does not rotate relative to the pipe clamping apparatus.

8. The system as claimed in claim 7 wherein the drive mechanism comprises at least one ram which is mounted on the guide and is operatively connected to the cam plate such that extension and contraction of the ram cause rotation of the cam plate relative to the guide.

9. The system as claimed in claim 8 wherein the guide and the cam plate define a ram space therebetween and wherein the ram is contained at least partly in the ram space.

10. The system as claimed in claim 9 wherein the cam plate defines a ram aperture for receiving the ram so that the ram is contained partly in the ram space and extends through the ram aperture.

11. The system as claimed in claim 6 wherein the guide comprises a guide plate which is disposed in a plane which is substantially perpendicular to the axis of rotation of the cam plate.

12. The system as claimed in claim 11 wherein the guide plate comprises a guide flange extending about the perimeter of the guide plate in a plane substantially perpendicular to the plane of the guide plate in a direction toward the cam plate so that the guide plate defines a cam plate housing and wherein the cam plate is contained within the cam plate housing.

13. The system as claimed in claim 12 wherein the guide flange defines a plurality of sleeves for receiving the plurality of backup shoe units.

14. The system as claimed in claim 12 wherein the guide flange comprises a guide ring mounted on the guide plate.

15. The system as claimed in claim 11 further comprising a centering shaft fixedly mounted with the guide plate such that the centering shaft extends therethrough, wherein the cam plate is rotatably mounted on the centering shaft, wherein the cam plate and the guide plate are connected by the centering shaft and wherein the cam plate is rotatable relative to the guide plate and the centering shaft.

16. The system as claimed in claim 8 wherein the power source is pneumatic so that the ram is pneumatically powered.

17. The system as claimed in claim 16 wherein the ram is double acting so that the power source is operative to cause the cam plate to rotate relative to the guide in the first direction and is operative to cause the cam plate to rotate relative to the guide in the second direction.

18. The system as claimed in claim 6 wherein the backup shoe units are capable of a limited range of radial movement between an inner limit and an outer limit without rotation of the cam plate relative to the guide.

19. The system as claimed in claim 18 wherein each of the backup shoe units comprises an urging mechanism for urging the backup shoe units toward the outer limit of the limited range of radial movement.

20. The system as claimed in claim 18 further comprising a primary retraction mechanism associated with the drive mechanism for providing a retraction force to retract the backup ring assembly.

21. The system as claimed in claim 20 further comprising auxiliary means for dislodging the backup ring assembly when at least one of the backup shoe units is stuck to the inner wall of the pipe in the extended position.

22. The system as claimed in claim 21 wherein the front clamping mechanism is capable of radial movement inward and outward relative to the axis of rotation of the cam plate and wherein the auxiliary dislodging means comprises an engagement surface on at least one of the backup shoe units for engaging the front clamping mechanism in response to inward radial movement of the front clamping mechanism when the backup shoe unit is not in the retracted position in order to urge the backup shoe unit radially inward.

23. The system as claimed in claim 21 wherein the rear clamping mechanism is capable of radial movement inward and outward relative to the axis of rotation of the cam plate and wherein the auxiliary dislodging means comprises an engagement surface on at least one of the backup shoe units for engaging the rear clamping mechanism in response to inward radial movement of the rear clamping mechanism when the backup shoe unit is not in the retracted position in order to urge the backup shoe unit radially inward.

24. The system as claimed in claim 21 wherein the cam plate defines a central axis and wherein the axis of rotation of the cam plate is offset from the central axis so that rotation of the cam plate relative to the guide in the second direction causes the backup shoe units to move radially inward sequentially toward the retracted position as the backup shoe units sequentially reach the outer limit of the limited range of radial movement.

25. The system as claimed in claim 21 wherein the outer limit of the limited range of radial movement of the backup shoe units varies so that rotation of the cam plate relative to the guide in the second direction causes the backup shoe units to move radially inward sequentially toward the retracted position as the backup shoe units sequentially reach the outer limit of the limited range of radial movement.

26. The system as claimed in claim 25 wherein the outer limit of the limited range of radial movement of the backup shoe units is varied by inserting shims in the backup shoe units to increase the outer limit.

27. The system as claimed in claim 21 wherein the configuration of each of the camming surfaces varies amongst at least some of the camming surfaces so that rotation of the cam plate relative to the guide in the second direction causes the backup shoe units to move radially inward sequentially toward the retracted position as the backup shoe units sequentially reach the outer limit of the limited range of radial movement.

28. The system as claimed in claim 6 wherein the drive mechanism is actuated independently of both the front clamping mechanism and the rear clamping mechanism.

29. The system as claimed in claim 28 wherein the front clamping mechanism is capable of radial movement relative to the axis of rotation of the cam plate between an extended position and a retracted position, wherein the rear clamping mechanism is capable of radial movement relative to the axis of rotation of the cam plate between an extended position and a retracted position and wherein the front clamping mechanism and the rear clamping mechanism extend further from the axis of rotation of the cam plate than does the backup ring assembly when each of the front clamping mechanism, the rear clamping mechanism and the backup ring assembly are in the retracted position.

30. The system as claimed in claim 6 wherein each camming surface comprises a camming slot, wherein each camming slot has an outermost end, and wherein the outermost end of each camming slot extends to the perimeter of the cam plate so that the backup shoe units can be removed from the backup ring assembly when the backup shoe units are in the extended position and the pipe clamping apparatus is not positioned inside a pipe.

31. The system as claimed in claim 30 further comprising a releasable retainer associated with each backup shoe unit for releasably retaining the backup shoe units relative to the camming slot when the backup shoe units are in the extended position and the pipe clamping apparatus is not positioned inside the pipe.

* * * * *